United States Patent
Pintsov

(10) Patent No.: US 7,415,431 B2
(45) Date of Patent: Aug. 19, 2008

(54) SYSTEM AND METHOD FOR TRUSTED SELF-BILLING AND PAYMENT FOR UTILITIES INCLUDING AUDIT, VERIFICATION, RECONCILIATION AND DISPUTE RESOLUTION

(76) Inventor: Leon A. Pintsov, 10 Governors Row, West Hartford, CT (US) 06117-1900

( * ) Notice: Subject to any disclaimer, the term of this patent is extended or adjusted under 35 U.S.C. 154(b) by 1053 days.

(21) Appl. No.: 10/169,283

(22) PCT Filed: Feb. 22, 2001

(86) PCT No.: PCT/US01/05643

§ 371 (c)(1),
(2), (4) Date: Jun. 27, 2002

(87) PCT Pub. No.: WO02/50704

PCT Pub. Date: Jun. 27, 2002

(65) Prior Publication Data

US 2003/0036918 A1 Feb. 20, 2003

(51) Int. Cl.
*G07C 1/10* (2006.01)
(52) U.S. Cl. .......................................... 705/32
(58) Field of Classification Search ................... 705/32, 705/63, 412
See application file for complete search history.

(56) References Cited

U.S. PATENT DOCUMENTS

| | | | | |
|---|---|---|---|---|
| 4,120,031 A | * | 10/1978 | Kincheloe et al. ............ | 705/412 |
| 4,585,904 A | | 4/1986 | Mincone et al. .............. | 179/7.1 |
| 4,751,728 A | | 6/1988 | Treat ........................... | 379/113 |
| 4,777,354 A | * | 10/1988 | Thomas ....................... | 235/380 |
| 4,803,632 A | * | 2/1989 | Frew et al. ................... | 705/412 |
| 4,813,065 A | | 3/1989 | Segala ......................... | 379/112 |
| 4,829,560 A | * | 5/1989 | Evanyk et al. ................ | 379/106.11 |
| 4,920,562 A | | 4/1990 | Hird et al. .................... | 379/132 |
| 4,935,956 A | | 6/1990 | Hellwarth et al. ............ | 379/112 |

(Continued)

FOREIGN PATENT DOCUMENTS

EP 0933916 A1 8/1999

(Continued)

OTHER PUBLICATIONS

Grzanka, Len; Bringing interactivity to the bill; Public Utilities Fortnightly; 1994 n18; dialog copy pp. 1-6.*

(Continued)

*Primary Examiner*—John W Hayes
*Assistant Examiner*—Nathan Erb
(74) *Attorney, Agent, or Firm*—McCormick, Paulding Huber LLP

(57) ABSTRACT

A system for validating service bills includes a first monitoring subsystem associated with and under the control of a service user for determining user generated fee values associated with the amount due a service entity for service usage over a predetermined billing period. A second monitoring subsystem communicating with the first monitoring subsystem is associated with and under the control of the service entity for determining service generated fee values associated with the amount due the service entity for the service usage over the predetermined billing period. One of the monitoring subsystems compares the user and service generated fee values and thereupon validates the amount due determined by one of the user and service generated fee values if such fee values are within a predetermined threshold amount.

39 Claims, 14 Drawing Sheets

U.S. PATENT DOCUMENTS

| | | | |
|---|---|---|---|
| 5,146,490 A | 9/1992 | Beckman | 379/113 |
| 5,214,587 A | 5/1993 | Green | 364/364.04 |
| 5,283,829 A | 2/1994 | Anderson | 380/24 |
| 5,299,197 A * | 3/1994 | Schlafly | 370/477 |
| 5,303,297 A * | 4/1994 | Hillis | 455/406 |
| 5,400,395 A | 3/1995 | Berenato | 379/114 |
| 5,689,476 A * | 11/1997 | Leach | 368/10 |
| 5,699,276 A | 12/1997 | Roos | 364/514 |
| 5,699,528 A | 12/1997 | Hogan | 395/240 |
| 5,742,669 A | 4/1998 | Lim | 379/130 |
| 5,757,784 A | 5/1998 | Liebowitz et al. | 370/321 |
| 5,793,854 A | 8/1998 | Kashepava | 379/130 |
| 5,841,847 A | 11/1998 | Graham et al. | 379/114 |
| 5,844,972 A | 12/1998 | Jagadish et al. | 379/114 |
| 5,852,812 A | 12/1998 | Reeder | 705/39 |
| 5,894,509 A | 4/1999 | Kasprzyk et al. | 379/112 |
| 5,909,485 A | 6/1999 | Martin et al. | 379/144 |
| 5,943,406 A | 8/1999 | Leta et al. | |
| 5,956,700 A | 9/1999 | Landry | 705/40 |
| 5,960,416 A | 9/1999 | Block | 705/34 |
| 5,963,925 A | 10/1999 | Kollig et al. | 705/40 |
| 5,991,742 A | 11/1999 | Tran | |
| 6,018,726 A | 1/2000 | Tsumura | 705/412 |
| 6,021,401 A | 2/2000 | Oravetz et al. | 705/412 |
| 6,023,499 A | 2/2000 | Mansey et al. | 379/111 |
| 6,070,150 A | 5/2000 | Remington et al. | 705/34 |
| 6,128,603 A | 10/2000 | Dent et al. | 705/40 |
| 6,163,602 A | 12/2000 | Hammond et al. | 379/114 |
| 6,980,973 B1 * | 12/2005 | Karpenko | 705/412 |

FOREIGN PATENT DOCUMENTS

| | | | |
|---|---|---|---|
| WO | WO 97/21299 | * | 6/1997 |
| WO | 0031955 A1 | | 6/2000 |

OTHER PUBLICATIONS

Gahran, Amy, "Utility Incentives Make Mftr. Competitive Despite High Rates," Energy User News, Sep. 1992, p. 1.*

Supplementary European Search Report dated Jan. 24, 2008 for EP Application No. 01911093.1 filed Feb. 22, 2001 (3 pages).

* cited by examiner

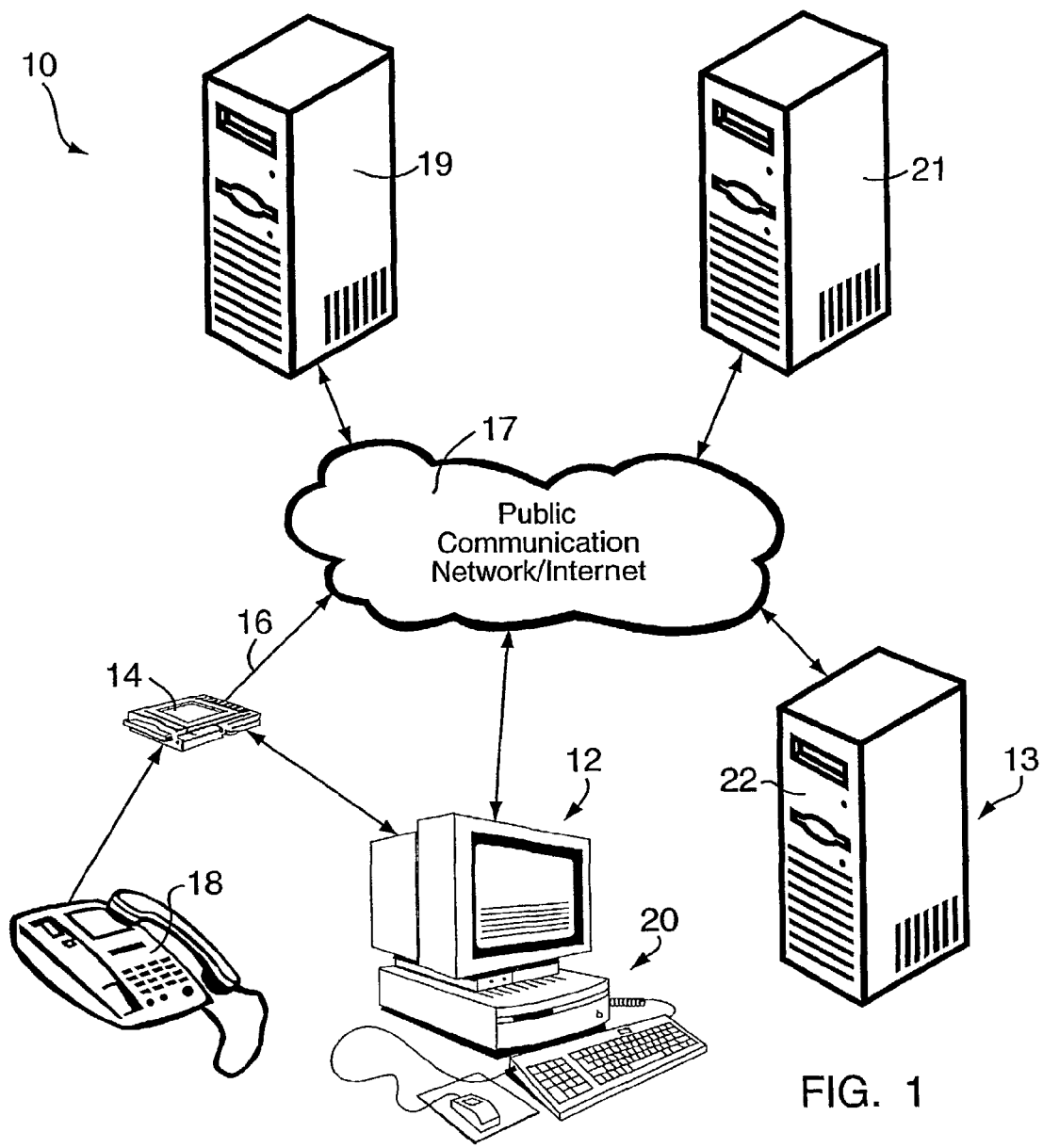
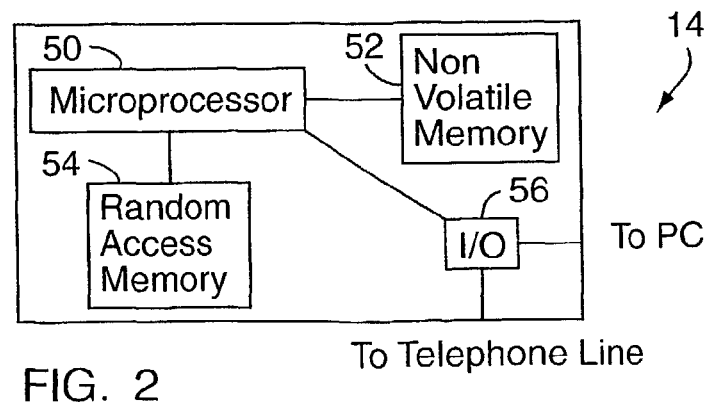
FIG. 1
FIG. 2

| | | | |
|---|---|---|---|
| Service Provider (carrier) ID | MCI987765 —102 | | |
| Rates Plan ID | mci124597765456 —104 | | |
| Customer ID/Account Number(optional) | dla96754443120037 —106 | | |
| Hash Value | 09467120937565449689 7747...3275 —108 | | |
| Local Rates | time period 1<br>00:00-07:00 | time period 2<br>07:00-12:00 | time period 3<br>12:00-24:00 |
| | rate($)<br>0.03 | rate($)<br>0.05 | rate($)<br>0.07 |
| Long Distance Rates | | | |
| Area Code 1:564 | time period 1<br>00:00-06:00 | time period 2<br>06:00-14:00 | time period 3<br>14:00-24:00 |
| | rate($)<br>0.04 | rate($)<br>0.08 | rate($)<br>0.07 |
| Area Code 2:575 | --------- | --------- | --------- |
| | --------- | --------- | --------- |
| Area Code N:937 | ----------------------------- | | |
| International Rates | ----------------------------- | | |
| Country 1:code 33 | time period 1<br>00:00-05:00 | time period 2<br>05:00-18:00 | time period 3<br>18:00-24:00 |
| | rate($)<br>0.11 | rate($)<br>0.15 | rate($)<br>0.13 |
| Country 2:code 44 | ----------------------------- | | |
| Country M:code 39 | ----------------------------- | | |
| Service Fees ($) | 03.00 | 02.00 | 04.75 |
| Taxes (%) | 2 | 3 | 4.5 |

FIG. 4

| Service Provider (carrier) ID | MCI987765 | 252 |
|---|---|---|
| Customer Account | dla96754443120037 | 254 |
| Payment Bank Account/ Credit Card # exp date | 1234 56578 9876 5432//032003 | 256 |
| Accounting Period | 10-1-1999:10-15-1999 | 258 |
| Digital Signature/algorithm ID | 09987655001236756454//RSA2048 | 260 |

| 262 | 264 | Local Calls 266 | 268 | 270 | |
|---|---|---|---|---|---|
| Date | Number | Time | Duration (min) | Charge($) | |
| 10-2-1999 | 860-1234567 | 07:05:40 | 08:57 | 0.45 | |
| 10-7-1999 | 860-7654321 | 19:57:33 | 11:45 | 0.60 | 271 |
| Total Local Calls Charges ($) | | 1.05 | | | |
| 272 | 274 | Long Distance Calls 276 | 278 | 280 | |
| Date | Number | Time | Duration (min) | Charge($) | |
| 10-3-1999 | 757-1234567 | 09:05:40 | 07:57 | 0.80 | |
| 10-5-1999 | 575-7654321 | 21:57:33 | 05:45 | 0.66 | 281 |
| Total Long Distance Calls Charges ($) | | 1.46 | | | |
| 282 | 284 | International Calls 286 | 288 | 290 | |
| Date | Number | Time | Duration (min) | Charge($) | |
| 10-3-1999 | 33-7531234567 | 14:05:40 | 17:57 | 3.60 | |
| 10-5-1999 | 39-375-7654321 | 23:57:33 | 34:45 | 3.50 | 291 |
| Total International Calls Charges ($) | | 7.10 | | | 292 |
| Total Calls Charges ($) | | 9.61 | | | 294 |
| Fees | 2.00 | 3.00 | 4.75 | | 296 |
| Taxes($) | 1.75 | 2.54 | 3.57 | | 298 |
| Total Charges for Accounting Period ($) | | 27.22 | | | |

FIG. 7

SYSTEM AND METHOD FOR TRUSTED SELF-BILLING AND PAYMENT FOR UTILITIES INCLUDING AUDIT, VERIFICATION, RECONCILIATION AND DISPUTE RESOLUTION

FIELD OF THE INVENTION

The present invention relates generally to a system and method for paying utility bills, and more particularly to a system and method for paying utility bills employing independent verification of the utility bill by the customer.

BACKGROUND OF THE INVENTION

Small and medium size business and households regularly pay utility bills, such as for telephone, Internet connection, electricity, gas and water services. The process of payment in the United States typically involves the user or customer examining the utility bill issued and sent (normally by mail) by a utility service provider or company (utility) for correctness and thereupon issuing and sending a check in a courtesy reply envelope to a remittance center of the utility company. The check is received, processed and sent to a clearing process at the end of which the amount of the check is transferred from the user's account in the user's bank to the utility's account in its bank. In European countries, utilities frequently enter into an agreement with their customers which allow them to deduct the amount of the bill directly from the customer's bank account. Customers typically have ten days after receipt of the notification to dispute the validity of the bill. In either case, however, the process frequently includes complex and costly dispute resolution concerning the amount owed the utility by the consumer.

The cost of operating the utility payment system represents a significant portion of the total cost of operating the utility. The cost of operating the payment system is defined as combined cost incurred by the user (customer) and utility company in the process of accounting for the charges and the transfer of payment from customer to the utility service provider. This cost has increased relative to other costs in the last twenty years, particularly in the telephone industry. The reason for the increase is that because of technological improvements all fundamental operations of the telephone network have been cost-reduced and streamlined while the payment system has essentially remained the same.

It is difficult to establish a "good" economically effective payment system. The customer (payer) and the utility (payee) have an adversarial relationship in the context of a payment system. The payer desires to pay a minimum amount and the payee desires to be paid a maximum amount. In order for the payment system to be effective it should be as free as possible from dispute over the bill amount. To minimize such disputes, the payer and payee should have confidence and trust in the accounting process of the payment system such that the payer and payee have a simple, effective way of reaching an agreement on the amount to be paid. The majority of utilities today use only one source of information for billing provided by the utility which does not give confidence to the customer that the billing procedure is correct.

In the instance of usage-based charges the task of bill audit and verification by customers is frequently time consuming, and in the case of discrepancies between the received and expected bill—real or perceived—the results can be a potentially difficult and time consuming dispute resolution process with the utility. This is the case for disputes over the amount of telephone bills which is aggravated by the complexity of rates, fees and charges. Presently—particularly in the United States—telephone companies which generally operate in a commodity market attempt to favorably distinguish their services from competitors by introducing new and more complex charge plans which may include several variables such as distance (local, interstate, international) and time of day (day and night time charges) variables. Frequently businesses and households in order to minimize expenses use several different utility service providers causing even more time consuming and difficult bill auditing and verification procedures.

From a utilities viewpoint the billing and revenue collection is the single, largest expense, the efficiency of which determines profit margins and the ability of utilities to compete in an increasingly competitive marketplace. Constraints on global economic efficiency demand that the overall revenue collection system for utilities, defined as combined costs incurred in the process of payment/revenue collection by customers and utility service providers, be minimized.

Many payment applications have requirements for tracking and documentation of the charges. For example, the most common application of this type is a business expense report. In this application, an employee who incurred expenses on behalf of the employer or for the business of the employer must keep accurate records of all qualified charges. This includes purchases, entertainment, lodging and meal expenses. Typically, paper records of all qualified expenses are kept by the employee, and then at the end of a predetermined period of time data from the paper records is entered into a computer application such as a spread sheet. Then the paper receipts are attached and a printed expense report with the summary of all charges is submitted to accounts payable. All records at accounts payable are manually verified and then the employee is reimbursed. There are multiple variations of this scheme, when, for example, an employee is given a corporate credit card he or she can use for charges. In all variations, however, the entire process is essentially manual because there are no easily available computerized records of the charges. The process as it exists today is also very costly, labor intensive and prone to errors.

Other costly and inefficient areas encountered in verifying and paying bills includes tax accounting, other accounts payable, insurance and other popular healthcare accounts. In the case of healthcare accounts, the account holder is required to maintain accurate records of all healthcare expenditures. Another example of an ineffective payment management process includes an insured needing to keep track of all deductibles when collecting from the insurance provider.

Accordingly, it is an object of the present invention to overcome these and other drawbacks and disadvantages associated with the revenue collection system of usage-based utility industries or other verification and payment of bills, and provide a set of intelligent features in the case when usage-based payment applications employ credit/debit cards.

SUMMARY OF THE INVENTION

Almost 95% of small and medium size businesses and over 50% of households in the industrial world own a personal computer. Personal computers are being used for a variety of data processing tasks, including accounting and payment. The present invention makes use of personal computer that can be interfaced with electronic devices such as telephones or modems that are used for utility services. The preferred embodiment of the present invention is illustrated with respect to telephone usage.

In one aspect of the present invention, a method for payment of utility bills to a utility company includes monitoring utility usage of the consumer by a first monitoring subsystem associated with and under control of the consumer. Preferably, the monitoring system includes a line or connection monitoring device (LMD) for monitoring utility usage such as, for example, telephone usage. At least one customer generated fee calculation representing the amount due a utility company for utility usage of the consumer over a predetermined billing period is calculated by means of the first monitoring subsystem so that the customer has a trusted source for determining how much he or she should expect to pay the utility service provider.

Utility usage of the consumer is also monitored by a second monitoring subsystem associated with and under control of the utility company. The first and second monitoring subsystems associated respectively with the customer and the utility service provider are distinct from one another. At least one utility generated fee calculation representing the amount due the utility company for utility usage of the consumer over the predetermined billing period is calculated by means of the second monitoring subsystem so that the utility service has its source for determining how much its customer should pay the utility service provider.

The customer and utility generated fee calculations are then compared, and thereupon the payment of the amount due represented by one of the customer and utility generated fee calculations is authorized if any difference between the customer and utility generated fee calculations is within a predetermined threshold value. The fee calculations may be compared either by the customer or the utility service provider upon prior agreement. For example, if the fee calculations are compared by the customer, the utility service provider will send or download to the customer's computer via the Internet the utility generated fee calculation for comparison with the customer generated fee calculation. If the fee calculations are compared by the utility service provider, the customer will send or download to the utility service provider's server via the Internet the customer generated fee calculation and payment for comparison with the utility generated fee calculation.

Preferably, the authorization for payment takes place as an electronic transfer of funds from a money withdrawal source of the customer to a money deposit source of the utility service provider. The customer and utility service provider may agree beforehand who authorizes the transfer. For example, if the customer compares the customer and utility generated fee calculations, the customer might authorize the transfer of money. Alternatively, if the utility service provider compares the customer and utility generated fee calculations, the utility service provider might authorize the transfer of money with the prior approval of the customer. In either case the absence of discrepancy enables a simple money transfer procedure.

In another aspect of the present invention, a system for payment of utility bills to a utility company includes a first monitoring subsystem associated with and under the control of a consumer for calculating at least one customer generated fee calculation associated with the amount due a utility company for utility usage of the consumer over a predetermined billing period. A second monitoring subsystem communicates with the first monitoring subsystem, and the second monitoring subsystem is associated with and under the control of the utility company for calculating at least one utility generated fee calculation associated with the amount due the utility company for utility usage of the consumer over the predetermined billing period. One of the first and second monitoring subsystems compares the customer and utility generated fee calculations. Preferably upon comparison, the one of the first and second subsystems performing the comparison authorizes the payment of the amount due represented by one of the customer and utility generated fee calculations if any difference between the customer and utility generated fee calculations is within a predetermined threshold value.

For telephone usage, a customer may have a calling plan which includes rates for different utility service providers as well as a precise method of computation for charges given relevant time duration and parameters. At the end of any predetermined accounting or billing period, the personal computer of the customer may process and summarize the data, and output summary information either on the computer screen, on a hard copy such as paper from a printer, or on a magnetic or an optical media such as floppy diskette or CD-ROM. This summary information may contain, for example, totals of charges for different utility service providers and grand total of payment due for the accounting period. The process of computing summaries in the user's personal computer in effect should replicate a similar process performed by the user's utility service provider such as the user's telephone company IT system. In the case of properly designed and functioning systems, the results of the expected amount due should be identical.

There are several possible ways to verify for correct billing information. The task of verifying correctness of billing information is expected to be performed by all responsible customers. In its simplest form, the user upon receiving a bill from his or her utility companies detailing charges for a given accounting period (typically a month) enters the beginning and last days of the accounting period into his or her personal computer and outputs a summary of charges. This summary has been computed by the user's personal computer under the user's control based on the data that was measured by the user's own LMD device. Thus, the summary of charges or customer generated fee calculations should be completely trusted by the user provided that the integrity of the LMD device and the used computing algorithm is trustworthy. The LMD device and software can be guaranteed, for example by the manufacturer, since the device and process for calculating usage are well known and not complicated, and can be checked using techniques described below.

Upon examination of the received bill the user may compare different charges or customer generated fee calculations including totals for local, long distance and international calls and the grand total, and if they are identical (or have a very small discrepancy, for example a few cents in the United States) the user issues and sends a check for the appropriate amount to the utility. This is the simplest case, and it provides limited economic benefits—primarily to the customer. Alternatively, the utility company may choose to send the bill electronically directly to the user's personal computer (using, for example, the Internet). In this case the personal computer may perform the comparison between the utility generated fee calculations in the received bill and the customer generated fee calculations in the computed summary. If this comparison results in a satisfactory match the personal computer may be instructed to issue an electronic payment, for example by sending appropriate information and instruction to the user's bank or a credit card company to deduct the total amount represented by the customer generated fee calculations indicated in the summary from the user's account and transfer it to the utility's account, the identity of which must be indicated in the bill. What constitutes a satisfactory match is predetermined by the user with the help of the flexible software allowing to change the criteria according to the user's desires. The process of bill payment thus may be completely automated so as to avoid entirely paper-based communication channels, thereby resulting in substantial savings to both customers and utilities.

Alternatively, the present invention contemplates avoiding sending the utility bill. The user and the utility may agree on the method of payment and on a predetermined accounting period such as, for example, two to three weeks or less. The length of the accounting period is normally determined by the balance between cash flow requirements, cost of money (interest rates and float) and the cost of billing and remittance processing. In the traditional environment, because these latter costs become prohibitively large the billing for relatively small amounts can not be done too frequently. The present invention overcomes this difficulty. At the end of the accounting period the user's computer may automatically generate usage and activities summaries containing at least one customer generated fee calculation and send them electronically to the utility while simultaneously sending authorization for payment for the appropriate amount to the user's bank or a credit card company. The utility's IT system upon receiving user's summary automatically compares the customer generated fee calculation in it with the utility generated fee calculation or usage data accumulated by the utility company for the accounting period. If matched, the utility accepts the data and verifies that electronic transfer of funds represented by either the customer or utility generated fee calculation indeed took place and that utility's account has been appropriately credited. The important feature of both utility and customer initiated payment procedures of the present invention are that they create trust between a customer and his or her utility service provider by allowing them to compare data originated from two independent sources of information. Even more importantly, the present invention allows for large reductions in expenses associated with bill generation, reconciliation (by the user) and remittance processing. These savings are estimated in the hundreds of millions or even billions of dollars since, for example, the cost bill generation, processing and remittance is estimated to be at $1.25-$1.50 per bill. Thus a single user's billing process generates $15-$18 per year in only the processing costs. Further, the expense of donning notices, and conducting billing dispute resolution makes the cost per customer to be as high as perhaps $21-$25 per year. Since there are at least 60 million computerized households and small businesses just in United States alone, this cost can amount to $1.2 billion to $1.5 billion annually. The present invention may result in a loss of a small amount of money by the user due to lost float on real time payments. In compensation, utilities may provide incentives to users to subscribe to the above-described modes of payment by giving discounts for services based on sharing in cost savings. Thus, the present invention capitalizes and expands on a recent trend toward customer self-service utilizing increasing computational and connectivity abilities of customer devices.

The confidentiality, integrity and authenticity of the data provided by either customer or utility or both may be achieved using modem tools of information protection as is more fully described below.

The present invention allows users and utility service providers to negotiate customized rates for the services (using the Internet). The present invention permits, for example, the customer to create his own desired rate plan and send it to several utility service providers that may be interested in servicing this customer. If the plan is acceptable to a service provider, the service provider sends acknowledgement to the customer.

The LMD may be any device capable of recording usage data in addition to a device using a smart card attached to a connection line such as a telephone or a cable line. Smart cards are portable and can be carried by the user and can record payment-relevant information in any transaction.

The system of the present invention also permits the measuring of both incoming and outgoing information from the user's personal computer such as, for example, the receiving and sending of digital products including movies, sound tracks, advertising messages etc. Other services may be used as well. For example, if there is a digital product distribution center with a menu of uniquely identifiable products with associated prices, the user may download various products and automatically compute and facilitate payment in accordance with the present invention. Similarly, if a data distribution service is capable of sending advertising information (electronically or physically) to a custom definable list of receivers, and if the service has a price list with prices depending on the size of the message, size of the list and other similar parameters, then the user may select the service and compute and facilitate payment automatically using a menu of downloaded prices in accordance with the system of the present invention.

The present invention also lends itself to automatic bills payment with a third party such as, for example, an Internet service provider. The user establishes a bank account accessible to a third party and at the end of the relevant accounting period the user sends all payment information (as measured by his LMD or other activity measurement devices and processed by his personal computer) to the third party authorizing the third party to make payment on his/her behalf.

The present invention also allows customers to use several different service providers simultaneously and send payment for services in an efficient manner, and permits easy comparison between different service plans. For example, a customer can "play" different service scenarios and easily estimate charges for these scenarios using his application software. These and other advantages of the present invention can be appreciated from the detailed description provided below.

The present invention may be used with credit/debit card billing/statement verification. A credit/debit payment card may be used as an intelligent portable device (IPD) capable of receiving information from an IPD reader/writer (also known as a terminal) installed at a point of sale in a merchant facility and the user's facility. The IPD may collect information of all users' purchasing activities and some preferences independently of computers employed by the credit card issuing company. Such use can be extended to home shopping using the Internet and e-commerce. If the user's personal computer at home is equipped with a terminal (an IPD reader/writer) as a peripheral device, then this terminal may automatically record all purchasing activities executed from the user's personal computer at home or from any other publicly available computer. The credit/debit card number is automatically read by the terminal and sent to a merchant and by the merchant to a credit card computer, while the IPD simultaneously records all relevant information, thus creating an independent record of purchasing activities. This approach has two additional benefits, namely the user does not have to key/type in his/her credit card number and thus saves effort and obtains an easy user-friendly and convenient way to shop. More importantly, this is a more secure method since entering credit/debit card information can be observed—especially in public places, and it is also error-prone. Thus, the transfer of credit/debit card information using personal computers with attached smart card terminals is more secure than traditional systems.

In the system of present invention the user may have a complete record of all his/her purchasing activities displayed at any desired moment in time and can compare this record with activities recorded by the credit/debit card operator obtainable, for example, through a credit/debit card company's web site. This has much improved security, since the user does not have to wait until the end of the accounting period to receive the bill/statement and compare it with the credit/debit card company's records, and in this way can detect fraudulent activities earlier and thereupon notify credit/debit card operator. The bill/statement verification process is completely automated for the user and can alert the user of any fraudulent activities.

The system of the present invention also allows for automatic downloading from specially designated web sites (servers) into the IPD various special discounts. The discounts create a highly effective automatic method that allows merchants to provide purchasing incentives complete with an automated payment mechanism. Special discounts can be downloaded only by authorized users (by user's access control through a password), thus allowing one-to-one marketing and discounting of merchandising. This allows individual discounts targeted to particular individuals, particular items (goods or services) or particular merchant facilities where a merchant might have an excessive inventory) or for a particular time period (if it is important for the merchant to sell goods before the end of a fiscal year or a quarter or any other significant event).

The system of the present invention also allows users to have a single physical device that can function as multiple credit or debit cards. It is well known that many individuals carry multiple credit and debit cards so that they can have greater flexibility in using their credit lines. Specifically, the IPD device can be programmed to store several identification numbers, for example one for an American Express card, one for a VISA card and one for a Master Card. These can be associated with single or multiple personal identification numbers (PINs). The advantage of this approach is that (besides a convenience of having a single card with multiple functionalities) it allows user's personal computer to preprogram the IPD for the card with optimal parameters. For example, a user having multiple credit lines and contemplating a purchase for a certain amount may have his personal computer search all available parameters of the user credit lines such as amount of available credit and interest rates charged and choose the optimal combination. The computer than can activate this optimal credit line as a preferred credit card number stored in user's IPD.

Additionally the system of the present invention allows for a broad set of user control over the type of merchandise or service to be purchased, price, time period when purchases can be made and the like. These and other features of the present invention are fully described below.

Moreover, the system of the present invention permits expenses recorded in an intelligent portable device to be assigned a purpose attribute identifier to categorize the expenses into, for example, personal, business, tax deductible and health care.

BRIEF SUMMARY OF THE DRAWINGS

FIG. 1 schematically illustrates a system for facilitating the payment of utility bills embodying the present invention.

FIG. 2 schematically illustrates a line monitoring device (LMD) used by the customer in accordance with the present invention.

FIG. 4 is an example of a rates plan file generated by the system of FIG. 1 in accordance with the present invention.

FIG. 7 is an example of a billing file generated under the control of a utility customer.

DETAILED DESCRIPTION OF THE PREFERRED EMBODIMENT

Figure 3:
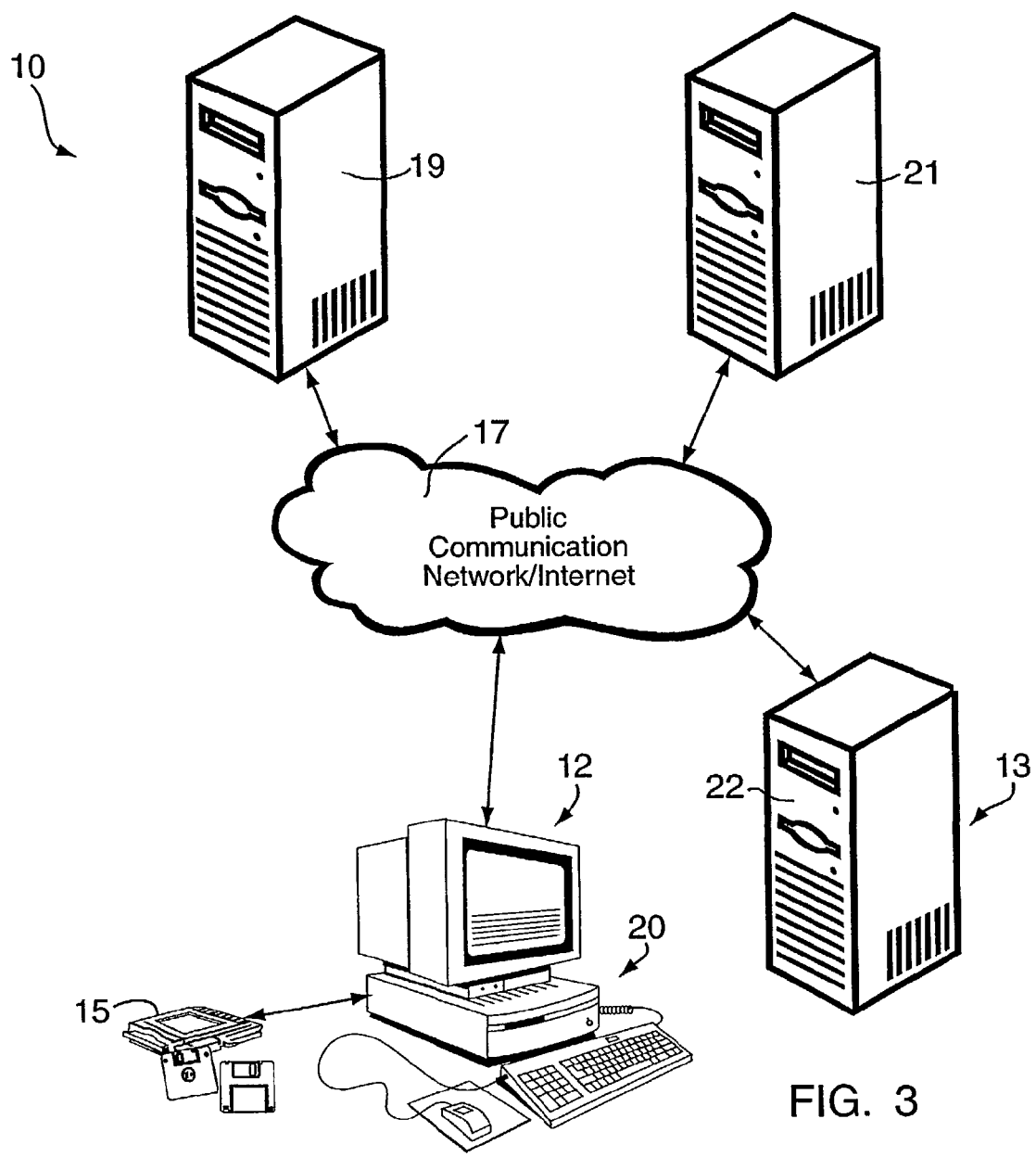
FIG. 3 schematically illustrates a usage recording device used by the customer in accordance with the present invention.

Trust in the accounting process may be established for the payer and payee if they both have independent and trusted sources of accounting information. If the payer and the payee can verify the accuracy of their sources and control them, then they will have confidence in the accounting process. The process of examining the utility bill for correctness may be accomplished by a comparison of the information obtained from both sources. If the information obtained from the two independent sources match, then both payer and payee will be confident that the accounting information is correct and costly dispute resolution will be avoided.

With reference to FIG. 1, a system for facilitating the payment of utility bills is generally designated by the reference number 10. The system includes a consumer subsystem 12 and a utility provider subsystem 13. The utility provider maybe any type service which can be transmitted to the customer for a fee. Such utilities may be, for example, water, gas, electricity, telephone, cellular phone, cable television, Internet, research and other database utilization, on-line services such as stock tracking, music, video and other entertainment services. In other words, the utility may be any usage which can be measured so that a self bill or summary of the amount due for such usage can be created and paid automatically as long as the information transmitted is identified by the type of service. The customer may be, for example, an individual using a utility at his or her residence, or a corporate customer or business. For purpose of illustration only, the present invention will be described with respect to telephone usage which may be employed over telephone lines or by wireless means for cellular phones.

The consumer subsystem or local payment accounting system (LPAS) 12 includes a line monitoring device (LMD) 14 coupled to a telephone line 16 for monitoring telephone usage of a telephone 18. The consumer subsystem 12 further includes a computer 20, such as a personal computer, typically equipped with a data communication device such as a modem or Ethernet card, wherein the computer is coupled to the LMD 14 and used by the consumer for calculating the amount of the user's telephone usage to be explained more fully below. The LMD 14 and the computer 20 are associated with and under the control of the consumer. The utility provider subsystem 13 has a server 22 which executes its central revenue accounting system. The customer subsystem 12 and the utility service provider subsystem 13 communicate over a public communication network or Internet 17. The customer subsystem 12 and the utility service provider subsystem 13 (with authorization from the customer) may have access to the customer's bank or credit card server 19 for electronic fund transfer of utility fees owed from the customer's money withdrawal source to the utility service provider's money deposit source, such as utility's bank server 21.

As shown in FIG. 2, the LMD 14 preferably includes a microprocessor 50 communicating with and controlling non-volatile memory 52, random access memory 54 and an input/output interface 56 to be coupled to the personal computer 20 and the telephone line of the telephone 18 (see FIG. 1). The LMD 14 may also communicate with a wireless device such as, for example, a cellular phone. This type of LMD is self-contained and includes, for example, a "smart card" for accumulating usage information. The LMD may then be inserted into a reader attached to the personal computer so that the computer may receive the usage information contained in the LMD, and thereupon generate fee calculations for the amount due for such usage.

Devices such as the LMD 14 are well known in the art. (See, for example, U.S. Pat. No. 5,841,847.) These devices intercept electrical signals that travel along telephone lines without interrupting telephone conversations, or such devices transfer and exchange data. The LMD 14 is preferably installed between a user's telephone apparatus and outlet of the telephone line (jack). The LMD 14 also communicates with the computer 20 through, for example, an RS 232 serial port, as is well known in the art. (See, for example, U.S. Pat. No. 5,841,847.) Thus, the user's personal computer 20 gains access to all data that can be measured by the LMD 14.

Two types of LMD are possible. Preferably, the LMD 14 is an "intelligent" and tamper resistant LMD with a computer processor and a non-volatile memory and is capable of performing information security processes such as cryptographic computations. These devices, one example of which is "smart cards" or "chip" cards, are well known in the art. (See, for example, Smart Card Handbook by W. Rankl and W. Effing, John Wiley & Sons, 1999.) An intelligent LMD sends a raw summary of activities data to the user's personal computer 20 while retaining a hash value and/or digital signature of the raw data for possible audit in the case of dispute or discrepancy over the amount the customer owes the utility service provider. A non-intelligent LMD merely sends to a computer a signal indicative of the recipient's telephone number and duration of the conversation (connection) as described in more detail below.

As an example of an intelligent LMD, when a user enters a telephone number to initiate a telephone conversation, the LMD 14 may automatically send a signal to a personal computer indicative of:

1) the identity information of the utility service provider,
2) the telephone call recipient telephone number,
3) the time of day when the connection has been established between the telephones of the user and the call recipient (time stamp of the beginning of the connection),
4) the time of day when the connection has been terminated between the telephones of the user and the call recipient (time stamp of the end of the connection), and
5) any other information which is relevant for computation of charges as defined by the utility service provider (for example the number of dial tones elapsed before the connection has been established). The precision of time measurements is determined by the required precision for computation of charges, but typically precision in seconds is sufficient.

The LMD 14 may be any device capable of recording usage data in addition to a device using a smart card attached to a connection line such as a telephone or a cable line. For example, FIG. 3 illustrates an LMD implemented as a usage recording device 15 having a smart card removably coupled to the usage device. Smart cards are portable and can be carried by the user and can record payment-relevant information in any transaction. When the user engages in a payment transaction such as when the user presents his or her smart credit or debit card for payment in a store, the card is inserted in a terminal capable of writing information on the card. This information can be a time-stamp and the unique identification code of a merchant as well as the amount of the transaction. When this information is recorded, simultaneously the terminal sends this information also to a server of the credit card company. This information then can be stored and made accessible to the user, for example, via a credit card company web site. This service is already available today. In doing so the credit card company implements appropriate confidentiality measures, making access to the confidential information password protected, using well known protocols, such as SSL. This arrangement saves the amount of operational memory required for the smart card. From a technical viewpoint, the only information that need be stored on the card is the unique identification of the transaction. Alternatively, if the user's personal computer is equipped with a smart card reader and smart card can store all relevant details of a transaction, the user then can review and process all his transactions using his/her personal computer. Such an arrangement allows the user to review all his or her transactions and authorize electronic payment at any moment—not only once a month as is typical today. In this arrangement it is possible to record both payments and credits such as, for example, for returned merchandise. Monitoring mobile phones is possible in a similar manner if mobile phones contain smart-card writing capabilities. The advantage over existing systems is the fact that transaction records are always maintained in two places with one of the places under control of the user, thus greatly improving trustworthiness and robustness of the entire system.

Referring again to FIG. 1 using the LMD 14 as a telephone monitoring device, the personal computer 20 of the customer is used as a data repository for all relevant payment computation data received by the LMD 14. The personal computer 20 is provided with a software application program or trusted self-billing application software (LPAS), to be explained more fully below, that allows a user to enter all relevant details of the user's calling plan in an easy, flexible and user friendly manner. For example, the customer's computer 20 will use a utility service provider's rates plan for generating a rates plan file (RPF), such as the rates plan file 100 illustrated as an example in FIG. 4, for determining the amount to be paid by the customer for a customer initiated telephone conversation based on various factors such as the time of day and whether the call is local or long distance.

As shown in FIG. 4, the rates plan file 100 includes a utility service provider identification 102, a rates plan identification 104, an optional customer identification/account number 106, a hash value (or digital signature or Message Authentication Code) 108 of the rates plan file 100, local rates 110 for three, eight hour time periods of the day, national long distance rates 112a through 112n respectively covering first through nth area codes, international rates 114a through 114m respectively covering first through mth country codes, service fees 116 and taxes 118 each covering three, eight hour time periods of the day. The hash value/digital signature 108 is used to determine if the data of the rates plan file 100 has been tampered with or otherwise corrupted and can serve as a legal basis for contract between the user and the utility.

Figure 5:
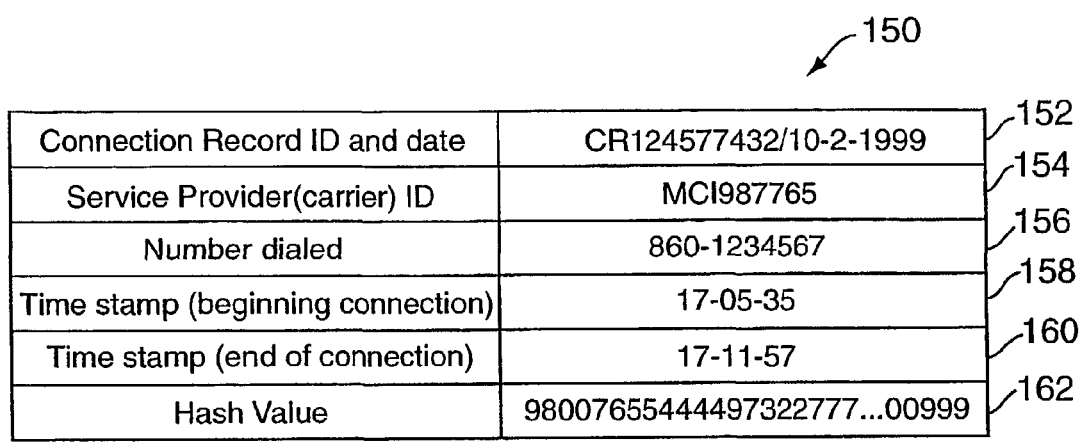
FIG. 5 is an example of a connection record generated under the control of a utility customer in accordance with the present invention.

The trusted self-billing application software residing on the computer 20 of the customer may be installed or executed by direct connection to a software service provider's server via the Internet, through a CD-ROM or floppy diskette that the user receives from the service provider, or in many other suitable ways. The LMD 14, shown in FIGS. 1 and 2, keeps track of connection records (CRs), such as the connection record 150 illustrated as an example in FIG. 5. As shown in FIG. 5, each connection record 150 includes a connection record identification and date 152, a utility service provider identification 154, a telephone number dialed 156, a time stamp of the beginning of the telephone connection 158, a time stamp of the end of the telephone connection 160, and a hash value or digital signature 162 of the connection record 150 to be used to determine if the data of the connection record 150 has been tampered with or otherwise corrupted.

Figure 6:
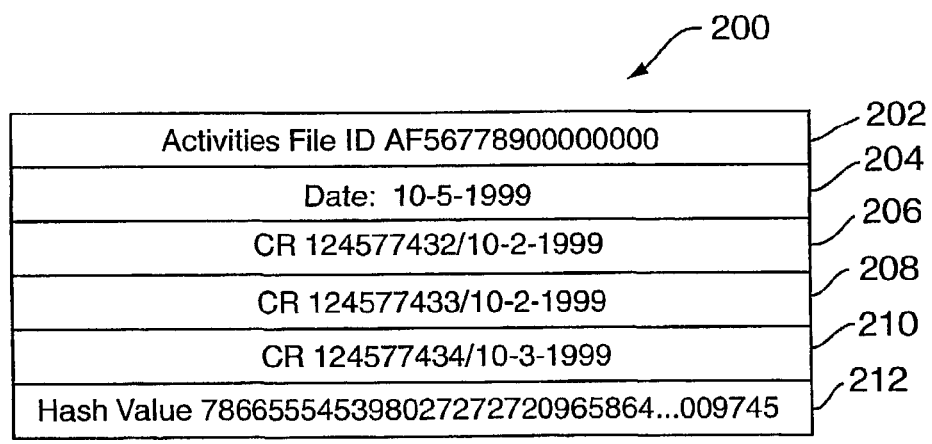
FIG. 6 is an example of an activities file generated under the control of a utility customer.

The LMD 14, shown in FIGS. 1 and 2, accumulates a set of connection records that form an activities file (AF), such as the activities file 200 illustrated as an example in FIG. 6, which serves as an input to the accounting process. The activities file 200 of FIG. 6 includes, for example, an activities file identification 202, date 204, and a plurality of connection records established over the period of time covered by the activities file 200, such as the first through third cross records 206, 208, 210. The activities file 200 also includes a hash value 212 of the connection record 200 which may be used to determine if the data of the activities file 200 has been tampered with or otherwise corrupted. The activities file 200 of FIG. 6 is stored in the non-volatile memory of the LMD 14 shown in FIG. 2, and is encrypted before being sent to the computer 20 of the customer subsystem 12 in order to protect against theft of the data received and transmitted by the LMD. If the LMD 14 were stolen, the LMD would not reveal any sensitive details of usage. The encryption process simply could be a symmetric key process such as described in Digital Encryption Standard described in Federal Information Processing Standard FIPS46-2. In this case, the computer 20 and the LMD 14 share a secret key that is generated within the LMD, sent to the computer during the system initialization process, and protected within the computer by an appropriate password.

At the end of the accounting process the trusted self-billing application generates a billing file (BF), such as the billing file 250 illustrated as an example in FIG. 7, from the activities file and the rates plan file. The billing file 250 includes a utility service provider identification 252, a customer account identification 254, a payment bank account, or credit card number and expiration date 256, an accounting period 258, and a digital signature value together with the algorithm identification 260.

The billing file 250 further includes customer generated fee calculations such as local call information including for each telephone call a date of call 262, telephone number 264, time of day call began 266, the duration of the call 268, the charge amount for the call 270, and the total charge 271 for the local calls. National long distance call information is also listed for each telephone call including a date of call 272, telephone number 274, time of day call began 276, the duration of the call 278, the charge amount for the call 280, and the total charge 281 for the national long distance calls. Likewise, international call information is also listed for each telephone call including a date of call 282, telephone number 284, time of day call began 286, the duration of the call 288, the charge amount for the call 290, and the total charge 291 for the international calls. The billing file 250 also includes the total charge 292 of the local, national and international calls over the billing period, and may include utility service fees 294 and applicable taxes 296. Finally, the billing file 250 includes a total charge 298 for the accounting period.

Referring again to FIG. 1, the utility service provider subsystem 13 includes the central revenue accounting system (CRAS) normally operated by a utility company. The utility service provider subsystem 13 preferably includes a server, such as the server 22, connected to the Internet, or includes a main-frame fault tolerant computer with an appropriate connectivity capable of receiving data from the customer subsystem 12 and from a data collection system employed by switching systems. Such central revenue accounting systems are typically employed by telephone utilities. The utility service provider subsystem 13 keeps track of all customers' calls and maintains files of customers' charges or utility generated fee calculations as customer invoice files (CIFs). The process of creation and maintenance of the customer invoice file is well known in the art and has been used for many years. The customer invoice file serves as a basis for customer invoicing and contains data elements identical to the data elements in the billing file generated by the trusted self-billing application running on the customer's computer 20 as fully described below. (See FIG. 7.) At the end of any accounting period the billing file generated by the customer subsystem 12 and the customer invoice file generated by the utility service provider subsystem 13 should contain identical accounting data including all relevant charges represented by customer generated fee calculations in the billing file and utility generated fee calculations in the customer invoice file. This allows for a simple validation process by the utility service provider. The validation process compares customer and utility generated fee calculations as well as other charge accounting data in the billing file and the customer invoice file. If identical, the utility service provider accepts payment either via electronic fund transfer or via the credit card process. Such details of payment transfer are also well known in the art. If, on the other hand; customer and utility generated fee calculations differ between the billing file and the customer invoice file, then the validation process determines the discrepancy between amounts. If this discrepancy does not exceed a predetermined threshold value, then the utility service provider subsystem 13 accepts the validity of the billing file and initiates the payment process. The predetermined value is defined based on business and economic considerations. It can be set, for example, at a 1% level for all bills that do not exceed $100, at 0.1% for all bills between $100 and $1,000, etc. The predetermined value takes into account cost of investigation and dispute resolution as well as other important parameters, such as for example, the payment history of a customer. Of importance is that even small discrepancies between the billing file generated under the control of the customer and the customer invoice file generated under the control of the utility service provider may be indicative of a systemic problem. During the course of normal operations all input data elements for computation of the billing file and the customer invoice file should have identical values. Any systematically observed difference between such elements may be indicative of malfunction in the LMD 14 or the trusted self-billing application of the customer, or a malfunction or bug in the hardware and software of utility service provider subsystem 13. The present invention, thus provides an effective detection mechanism for maintaining an error-free billing system. Maintaining an error-free billing system is substantially more difficult without having second independent source of information at the local site of the customer.

Figure 8:
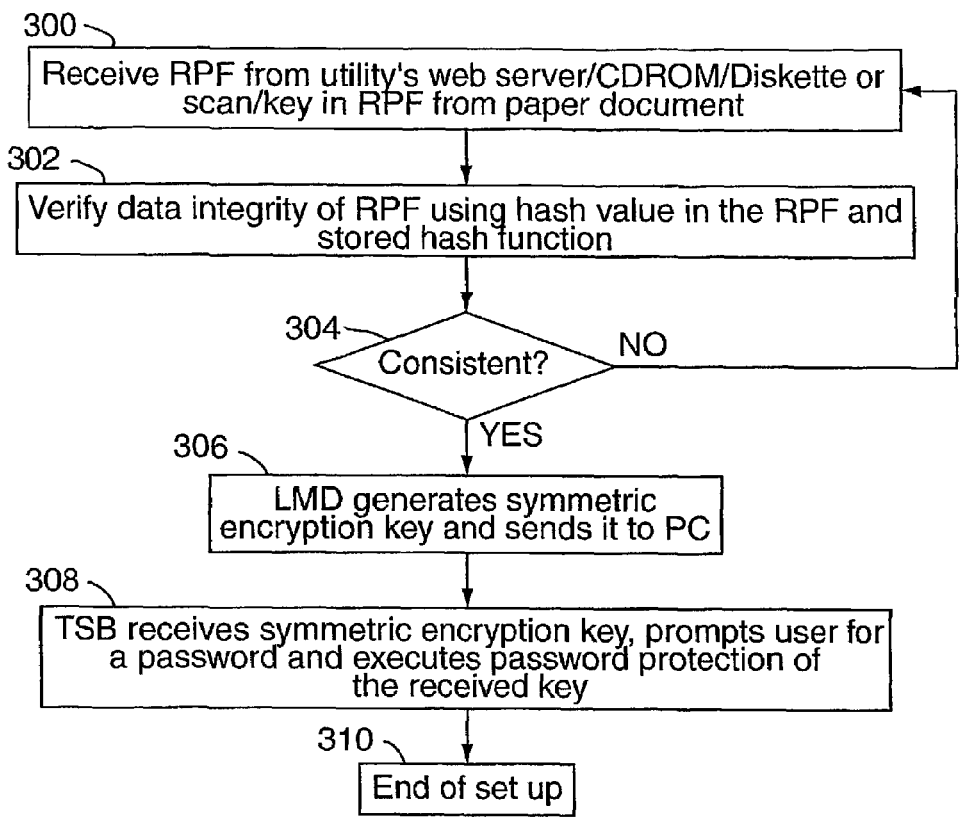
FIG. 8 is a flow diagram illustrating an example of a customer set up process for employing the system of FIG. 1.

Referring to FIG. 8, a set up process is illustrated for a customer using a trusted self-billing application software residing on the customer's personal computer 20 (see FIG. 1). The customer's personal computer 20 receives a rates plan file (see FIG. 4) from a utility service provider's web server, a CD-ROM, a diskette or by scanning or keying in the rates plan file from a paper document (step 300). The data integrity of the rates plan file is verified using a hash value/digital signature in the rates plan file and stored in the user's computer by means of an algorithm for computing a hash function (step 302). It is then determined if the contents of the rates plan file is consistent with its hash value (step 304). If not, a new rates plan file is received into the customer's personal computer 20. If the data is consistent, the LMD 14 (see FIGS. 1 and 2) generates a symmetric encryption key and transmits it to the personal computer 20 (step 306). The trusted self-billing application residing on the personal computer 20 receives the symmetric encryption key, prompts the user of the personal computer 20 for a password, executes password protection of the received key (step 308), and thereupon set up is complete (step 310).

Figure 9:
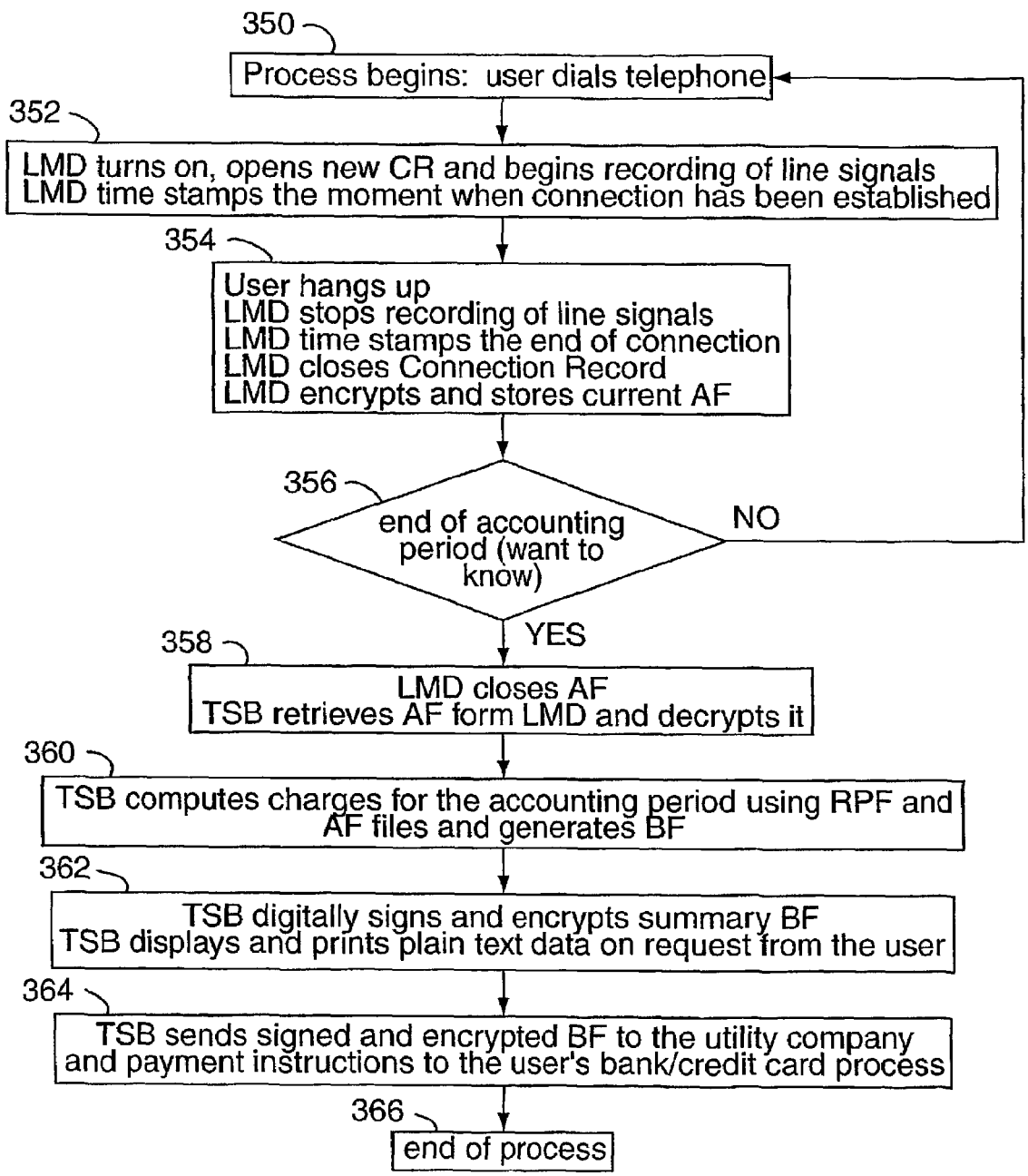
FIG. 9 is a flow diagram of a local accounting process under the control of a utility customer in accordance with the present invention.

FIG. 9 illustrates the operation of the customer subsystem 12 of FIG. 1 in monitoring and calculating the amount owed a utility service provider. The user operation begins when the user enters a telephone number (step 350). The LMD 14 (see FIGS. 1 and 2) turns on, opens a new connection record, begins recording of telephone line signals, and time stamps the moment when connection between caller and recipient has been established (step 352). When the telephone connection is terminated by the caller and recipient, the LMD 14 stops recording the telephone line signals, time stamps the end of the connection, closes the connection record, and encrypts and stores the current activities file (step 354). The trusted self-billing application residing on the customer's personal computer 20 determines whether it is the end of an accounting period (step 356). This is typically accomplished when the user indicates to the trusted self-billing application via the keyboard of the personal computer 20 that it is the end of the accounting period. This also can be accomplished upon receiving a signal from the central revenue accounting system of the utility service provider subsystem 13 without direct involvement of the user. If it is not the end of an accounting period, steps 350 through 354 are repeated for each subsequent telephone call initiated by the customer. If it is the end of an accounting period, the LMD 14 closes the activities file, and the trusted self-billing application receives the activities file from the LMD 14 and decrypts it (step 358). The trusted self-billing application computes charges for the accounting period using the rates plan and the activities files and generates the billing file (step 360). The trusted self-billing application digitally signs and encrypts summary billing file, and displays and prints plain text data on request from the user (step 362). The billing file is digitally signed and encrypted to protect confidentiality and integrity of the data in the billing file as well as to authenticate the customer to the central revenue accounting system of the utility service provider subsystem 13 as the legitimate owner of the billing file. The process may use any of the existing and well known in the art protocols such as SSL or SET. (See for example, S. Thomas, SSL and TIs Essentials: Securing the Web, John Wiley & Sons, 2000.)

Other methods of signing and encryption are equally possible. For example, in the simplest possible way, signing and encryption may be accomplished merely by including a public key of the central revenue accounting system of the utility service provider subsystem 13 into the rates plan file. This key then can be used for signature and encryption, provided that the public key encryption scheme being used is reversible. The trusted self-billing application sends the signed and encrypted billing file to the central revenue accounting system of the utility service provider subsystem 13 for reconciliation and appropriate payment instructions either directly to the customer's bank or to a credit card company, and thereupon the process ends for the accounting period (step 366). In the above process, the control over the payment process resides with the customer which minimizes customer disputes over the utility bill.

Figure 10:
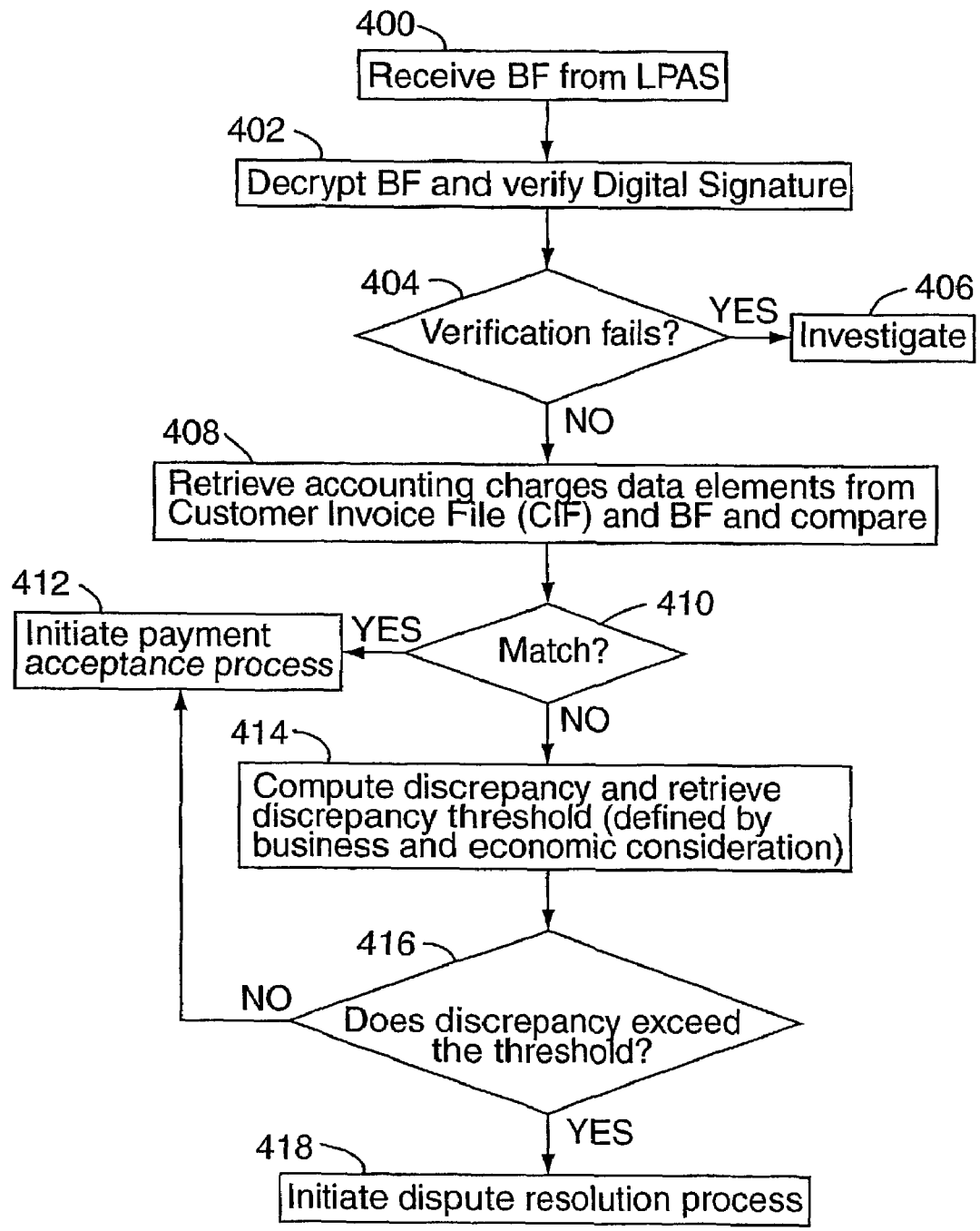
FIG. 10 is a flow diagram illustrating as an example a billing file audit and reconciliation procedure in accordance with the present invention.

FIG. 10 illustrates an example of a billing file audit and reconciliation by a central revenue accounting process of the utility service provider subsystem. A billing file is received at the utility service provider subsystem 13 from the customer subsystem 12, as shown in FIG. 1 (step 400). The central revenue accounting system of the utility service provider subsystem 13 decrypts the billing file and verifies its digital signature (step 402). It is then determined by the subsystem 13 whether the verification fails (step 404). If yes, the utility service provider investigates (step 406). If the verification passes, the central revenue accounting system retrieves accounting charge data elements including utility generated fee calculations from the customer invoice file generated by the utility service provider subsystem 13 and compares them with the charge data elements including customer generated fee calculations of the billing file generated by the customer subsystem 12 (step 408). The utility service provider subsystem 13 then determines if the data elements of the customer invoice file and the billing file match (step 410). If there is a match, the utility service provider subsystem 13 initiates a payment acceptance process of an amount represented by one of the customer and utility generated fee calculations (step 412). If the data elements do not match, the utility service provider subsystem 13 computes the discrepancy and retrieves a discrepancy threshold amount determined by business and economic considerations of the utility service provider (step 414). The utility service provider subsystem 13 then determines whether the discrepancy exceeds the threshold (step 416). If the threshold is not exceeded, the payment acceptance process is initiated (step 412). If the threshold is exceeded, a dispute resolution process is initiated (step 418).

Figure 11:
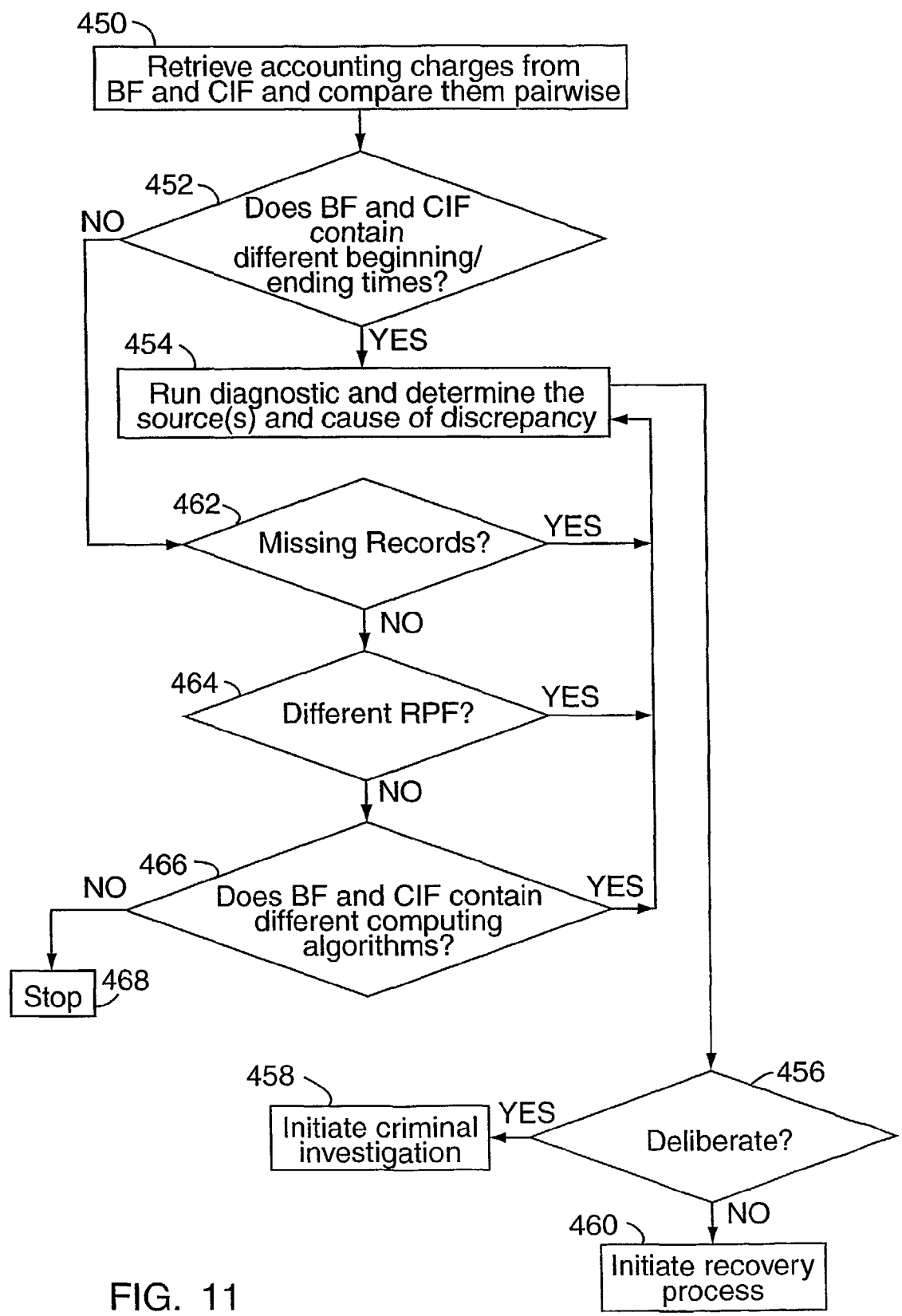
FIG. 11 is a flow diagram illustrating as an example a discrepancy resolution process in accordance with the present invention.

FIG. 11 illustrates an example of a discrepancy resolution process by the central revenue accounting system of the utility service provider subsystem. The central revenue accounting system of the utility service provider subsystem 13 (see FIG. 1) retrieves accounting charges from the billing file generated by the customer and the customer invoice file generated by the utility service provider and compares their data elements (step 450). The central revenue accounting system then determines whether the billing file and the customer invoice file contain different beginning or ending times (step 452).

If the billing file and the customer invoice file contain different beginning or ending times (step 452), the central revenue accounting system executes a diagnostic and determines the source or sources and cause of the discrepancy (step 454). If it is determined that the discrepancy is deliberate by the customer (step 456), a criminal investigation is initiated (step 458). If the discrepancy is not deliberate, a recovery process is initiated (step 460).

A discrepancy of the beginning and ending times in the billing file and the customer invoice file may be indicative of malfunction in the LMD 14 of the customer or the central revenue accounting system hardware and/or software. Systemic differences would allow a diagnostic software in the central revenue accounting system to determine possible cause(s) of discrepancy and verify it by requesting connection records from the LMD 14 and similar records from the central revenue accounting system.

If the billing file and the customer invoice file contain the same beginning and ending times (step 452), then the central revenue accounting system determines if there are any missing records of some connections in the billing file or in the customer invoice file (step 462). If there are missing records, the diagnostic (step 454) and subsequent steps are executed to determine the source and cause of the discrepancy, as well as to determine whether the discrepancy is deliberate.

If the BF does not include some connections recorded in the customer invoice file, it may be indicative of a hardware malfunction, or a deliberate disruption of the LMD 14 by the user. In the latter case, the user may have attempted to disconnect the LMD in order to avoid payment. In this case the utility service provider may request examination of the LMD 14. By design, the LMD 14 contains non-volatile memory (see FIG. 2) and stores digitally signed records of all calling activities. Absence of records that are clearly present in the customer invoice file may provide evidence of deliberate fraudulent attempts so as to warrant criminal investigation and requiring proof of calling activities from receivers of calls that are missing from the billing file. Further, if the customer invoice file does not include certain connections recorded in the billing file, this may be a clear indication of malfunction within the central revenue accounting system. Such absent records will enable the utility service provider to be aware of its problem in order to thereupon fix the problem within the central revenue and accounting system.

If there are no missing records (step 462), it is then determined whether the billing file is based on a rates plan file that is different from that used by the utility service provider (step 464). If the billing file is based on a different rates plan file, then the diagnostic (step 454) and subsequent steps are executed to determine the source and cause of the discrepancy, as well as to determine whether the discrepancy is deliberate.

The rates plan file of the utility service provider contains a hash value/digital signature to protect its data integrity. A corruption in data integrity is indicative of a hardware or software malfunction in the customer subsystem 12 or central revenue accounting system of the utility service provider subsystem 13 or both. An appropriate diagnostic procedure will be able to determine the location of the problem and fix it.

If the billing file is based on the same rates plan file (step 464), it is then determined whether the billing file and the customer invoice file contain amounts owed generated from different computing algorithms (step 466). If the billing file and the customer invoice file are based on different computing algorithms, then the diagnostic (step 454) and subsequent steps are executed to determine the source and cause of the discrepancy, as well as to determine whether the discrepancy is deliberate.

The trusted self-billing application of the customer running on his or her personal computer 20 can be certified to perform correctly and provided with a hash value of the trusted self-billing application. In case of discrepancy between computing algorithms, the customer's personal computer 20 may verify the correctness of the trusted self-billing software application computational algorithm before every execution. A similar procedure may be employed at the central revenue accounting system of the utility service provider subsystem 13. The discrepancy verification process will determine and verify possible causes of discrepancy. Again, a deliberate attempt by the user to substitute correct trusted self-billing software with something else will be detectable by the utility service provider. The utility company then can use such discrepancy as proof of deliberate fraud and fine or prosecute perpetrators. This procedure will provide a strong deterrence effect to tampering with the trusted self-billing application.

However, if the trusted self-billing application is proven to be correct, then any discrepancy between the billing file and the customer invoice file computing algorithms is indicative of a malfunction within the central revenue accounting system of the utility service provider subsystem 13. Appropriate diagnostic procedures well known in the art enable the utility service provider to determine the location of the problem and thereupon fix it.

If the billing file and the customer invoice file are not based on different computing algorithms (step 466) the process is stopped (step 468) and further investigation must be decided for the specifics of the case.

Although the system for facilitating payment of utility bills has been described by way of example with respect to telephone usage monitored by the user from a personal computer, the system may also be used in other applications taking place at the user's personal computer or at remote locations relative to the user's personal computer as will be explained with reference to FIGS. 12-14. In such applications, the line monitoring device (LMD) 14 shown in FIG. 2 may be a portable device including a microprocessor 50, non volatile memory 52, random access memory 54 and an input/output interface 56. Portable LMDs are capable of retaining memory content without a continuous power supply (e.g. battery-less devices) and are particularly beneficial for applications with credit/debit payment cards. In this case the LMD may be called an intelligent portable device (IPD) since the main function of the device shifts from monitoring to certain intelligent functions as described in full detail below. Examples of IPDs are well known in the art and include, for example, "smart cards" and PCMCIA cards which are more complex devices than smart cards. Smart cards typically have up to 64 or 128 Kbytes of memory. PCMCIA cards typically have more memory and more powerful processors, but are bulkier and more difficult to interface with the outside devices. For the purpose of the present invention to be explained below, the IPD preferably has 1) a memory capable of holding information without a continuous power supply, 2) a microprocessor capable of executing various computations including comparison tests, and 3) an input/output system in communication with external devices for downloading and uploading information from such devices. Other devices having battery-supported memory are not precluded from use with systems embodying the present invention but would be less convenient than devices without batteries.

As mentioned previously with respect to FIG. 3, the present invention may be used with credit/debit card billing/statement verification. A credit/debit payment card used as an IPD capable of receiving information from an IPD reader/writer 15 (also known as a terminal) installed at a point of sale in a merchant facility and the user's facility. The IPD collects information of all users' purchasing activities and some preferences independently of computers employed by the credit card issuing company. Such use can be extended to home shopping using the Internet and e-commerce. If the user's personal computer at home is equipped with a terminal (an IPD reader/writer) as a peripheral device, then this terminal may automatically record all purchasing activities executed from the user's personal computer at home or from any other publicly available computer. The credit/debit card number is automatically read by the terminal and sent to a merchant and by the merchant to a credit card computer, while the IPD simultaneously records all relevant information, thus creating an independent record of purchasing activities. This approach has two additional benefits, namely the user does not have to key/type in his/her credit card number and thus saves effort and obtains an easy user-friendly and convenient way to shop. More importantly, this is a more secure method since entering credit/debit card information can be observed—especially in public places, and it is also error-prone. Thus, the transfer of credit/debit card information using personal computers with attached smart card terminals is more secure than traditional systems. The system of present invention requires that this terminal have the ability to write into the memory of the IPD. This is easily accomplished and devices with such capability are commercially obtainable and well known in the art.

In the system of present invention the user may have a complete record of all his/her purchasing activities displayed at any desired moment in time and can compare this record with activities recorded by the credit/debit card operator obtainable, for example, through a credit/debit card company's web site. This has much improved security, since the user does not have to wait until the end of the accounting period to receive the bill/statement and compare it with the credit/debit card company's records, and in this way can detect fraudulent activities earlier and thereupon notify credit/debit card operator. The bill/statement verification process is completely automated for the user and can alert the user of any fraudulent activities. The system of the present invention as will be seen later also permits the detection of so-called "merchant fraud" and thus provides a desired deterrence effect against such fraud. Merchant fraud is fraud committed by merchants against consumers and typically does not cause harm to credit/debit card issuers.

When smart cards (IPDs) are employed as credit cards, their ability to execute fairly complex computations is used primarily for identification/authentication purpose to protect against fraudulent misuse of the card (see for example U. Hansmann, M Nicklous, T.Schak, F. Seliger, Smart Card, Application Development Using Java, Springer-Verlag, 2000). However, there are many other useful applications that can take advantage of the IPD computational abilities. For example, it is cumbersome and difficult to implement multiple special discounts and negotiated rates programs. When an entity negotiates a special discount for its representatives or employees with another entity (a merchant) for purchasing of certain items (which is frequently the case with fairly expensive items such as office computers, printers, fax machines, transportation tickets, lodging rates and the like) a variety of paper-based notices and certificates are distributed to different parties involved, such as employees and clerks working for the merchant. Purchasers involved have to remember to carry these paper-based documents to merchant's facilities and the process of verification of their validity is long, cumbersome and prone to errors. Users may also want to control various aspects of payment transactions independently of the smart credit/debit card (or other IPD) issuing company. Also, a merchant or a manufacturing company may want to eliminate excessive inventories by offering their preferred customers discounted prices. In this case, purchasers would be provided with an authenticated access to special web sites (servers) (for example through e-mail or direct mail) where they can review offered goods and services and download discounted prices into their IPDs (e.g. smart cards).

This is not possible with existing systems, and yet has many benefits as described below. The present invention aims to overcome these and other difficulties by using computational capabilities inherent in the IPDs. This comes essentially at no cost since these capabilities are already built into the IPDs (such as smart credit/debit cards) for reason of security.

When a company negotiates a special discount with a merchant for its employees and agents, it would normally distribute information concerning discounts through paper-based documents. These documents must be presented at the time of purchase for verification in a face-to-face manner at the point of sale or, alternatively, certain identification information must be communicated (through a telephone or a computer network) in the case of remote purchasing activities. In either case, the information has to be checked by a merchant's clerk either manually or automatically by a computer upon entry into computer system. The process is time consuming and prone to errors and purchasers frequently can not obtain discounts either because they forget to ask for discounts or because they choose not to ask because of the complexity of the process. As a result, millions of dollars are unclaimed depriving purchasers of substantial savings and thereby forcing merchants into other less effective methods of reducing inventory. Effective management of the process of individual marketing and merchandising with (custom) discounts is a big challenge. It is an especially acute problem now when special discounts and one to one marketing are becoming increasingly popular tools of commerce. The system embodying the present invention overcomes these and other difficulties by automating the process of claiming a discount and payment by using intelligence of the IPD.

Any discount program involves a merchant party and a purchasing party. The purchasing party includes its employees or other agents that are referred below as users or consumers. Each user has a personal computer connected to a computer network (such as the Internet) and is capable of downloading information from other computers and servers connected to the same network. The information typically is accessed from Internet web sites associated with the merchants. In addition each user has an IPD such as smart credit/debit card or the like. Each merchant party has computerized terminals such as an IPD reader/writer. These terminals are connected to distributed point of sales computers or other centralized computers/servers containing information concerning all available merchandise. This information is described in more detail below.

The information parameters that are required for implementation of various applications with IPD are as, follows:

First, items that are subject to special rates or purchasing prices must be identified. We shall use the notation <<ItemId>> for the item identifiers. For example, standard universal codes or a part of such codes can be used as <<ItemId>> to identify items or classes of items. The <<ItemId>> may identify various physical merchandise items such as household goods, items of clothing, pieces of office equipment, as well as services such as automobile repairs, maintenance, travel services, tickets and the like.

Second, the merchant providing discounts or special rates must be uniquely identified. We shall use notation <<Merchant&FacilityId>> for merchant identity including identities of all merchants' facilities where discounts are applicable. For example, folio numbers may be used as <<Merchant&FacilityId>> to identify hotel operators.

Third, the price for the item must be accounted for. In one example, a percentage or amount of a negotiated or offered discount needs to be identified. To accommodate various applications and controls we shall use notation <<Price/Discount>> meaning ether absolute value of the price or absolute value or relative discount expressed as percentage of the price before discount depending on the application.

Fourth, for any application requiring intelligent control with the IPD a validity period must be established. This typically means date and time of the beginning and the end of a validity period. We shall use notation <<Validity>> to identify the validity period.

Additional information may be provided. In other words, the list of the identified information parameters is in no way exhaustive and is meant to represent a set sufficient for illustrative examples. For example, typically the IPD has a single unique identification number (also known in the case of credit or debit card as a card number). This does not have to be the case with the IPD employing computational capabilities inherent in intelligent devices such as smart cards. The IPD may store multiple identities that can be associated with different credit or debit card service providers. These identities may be associated with different PIN numbers or a single PIN number depending on the application. The user can choose the card identity <<IPD ID>> either prior to engaging in the purchasing activity or during the purchasing activity. The benefit of these arrangements are twofold. First, if a user has multiple credit lines with different associated parameters (e.g. credit limit and interest rate), the user may activate the credit line with optimal parameters for every purchasing activity by notifying merchant's clerk (in the case of face-to-face purchasing) or through a user's personal computer in the case of purchases over the Internet. Second, a single IPD provides great convenience for the user and additional security for the IPD's issuing company because there is a lesser chance of losing a single card than losing multiple cards.

The system of the present invention including the IPD may be employed for distributing special discounts. Negotiations for special discounts are typically done by a purchasing agent or other party either through direct negotiations or through other commercial mechanisms such as computerized auctions.

Upon negotiating a special discount, the purchasing party places all relevant information for all negotiated items such as <<ItemId>>, <<Merchant&FacilityId>>, <<Price/Discount>> and <<Validity>> at an appropriate web site or other computerized data base easily accessible by computers that belong to users. Only authorized personnel using appropriate methods of access and channel security controls (e.g. passwords, biometrics, SSL or similar secure communication protocols) can access such web sites. All required information including, but not limited to <<ItemId>>, <<Merchant&FacilityId>>, <<Price/Discount>> and <<Validity>> is formatted for downloading to computers that belong to users. These users for example may be required to regularly access a special web site or other computerized data base containing <<ItemId>>, <<Merchant&FacilityId>>, <<Price/Discount>> and <<Validity>> information and designated for discount programs by the purchasing party to download this information through their computers into their IPDs. The process of downloading discounts into an IPD is protected against inadvertent or deliberate data alteration by employing hash/digital signature mechanisms as described above for the utility (telephone) rates downloading.

The merchant party upon negotiating special discounts with the purchasing party also places all relevant information such as <<ItemId>>, <<Merchant&FacilityId>>, <<Price/Discount>> and <<Validity>> at all point-of-sale computers or a central computer accessible by the point-of-sale computers with attached IPD terminals. All other computers that host web sites of the merchant party and designed to facilitate purchasing over the Internet using methods of e-commerce are also provided with this information. All relevant merchants' computers containing information concerning all negotiated discounts will be referred to as "merchant's computer".

All users and agents of the merchant that can be engaged in purchasing activity are provided with the relevant computerized information fully describing details of the negotiated arrangement.

The purchasing transaction proceeds as follows. A user presents his/her IPD (possibly together with an item that he/she intends to purchase) at a merchant facility (when purchasing is done face-to-face). Alternatively the user inserts his/her IPD into an IPD reader/writer attached to his/her personal computer (or the like) when purchasing is done over the Internet. The IPD contains all relevant discount information that was previously downloaded from the purchaser secure web site while all the merchant's relevant computers contain the same discount information as described above.

In the case of face-to-face purchasing, a clerk employed by the merchant enters item-related information into the point-of-sale computer while the user enters his/her password or other identification information into the IPD's reader/writer. Upon successful completion of the identification process which authenticates the user IPD to the merchant's point-of-sale computer and vice versa, the <<ItemId>> is transferred to the IPD's reader/writer together with the <<Merchant&FacilityId>> and the merchant's nominal price for the item. The IPD's reader/writer enters this information into the IPD. Upon receiving <<ItemId>>, <<Merchant&FacilityId>> and the nominal price for the item the IPD compares this information with the information on <<ItemId>> and <<Merchant&FacilityId>>stored in its memory and computes an appropriate discount using <<Price/Discount>> information if the item is entitled for a negotiated special discount. (If the item is not a subject to a negotiated discount, the IPD upon approval of payment of the nominal price by the user, stores the information including the paid nominal price for future verification by the user and the process terminates.) Then the IPD through the IPD's reader/writer terminal notifies merchant's point of sale computer or (through a network) a central merchant's computer of the negotiated price and requests a discount. At this point information <<ItemId>>, <<Merchant&FacilityId>>, <<Price/Discount>> and <<Validity>> is transferred for verification to the merchant's computer. If <<ItemId>>, <<Merchant&FacilityId>>, <<Price/Discount>> and <<Validity>> information transferred from the IPD matches similar information stored in the merchant's computer, the merchant's computer authorizes the transaction and the process terminates after all required information is stored in the IPD memory. If two sets of information parameters do not match, the process terminates and a manual investigation commences.

Figure 12A:
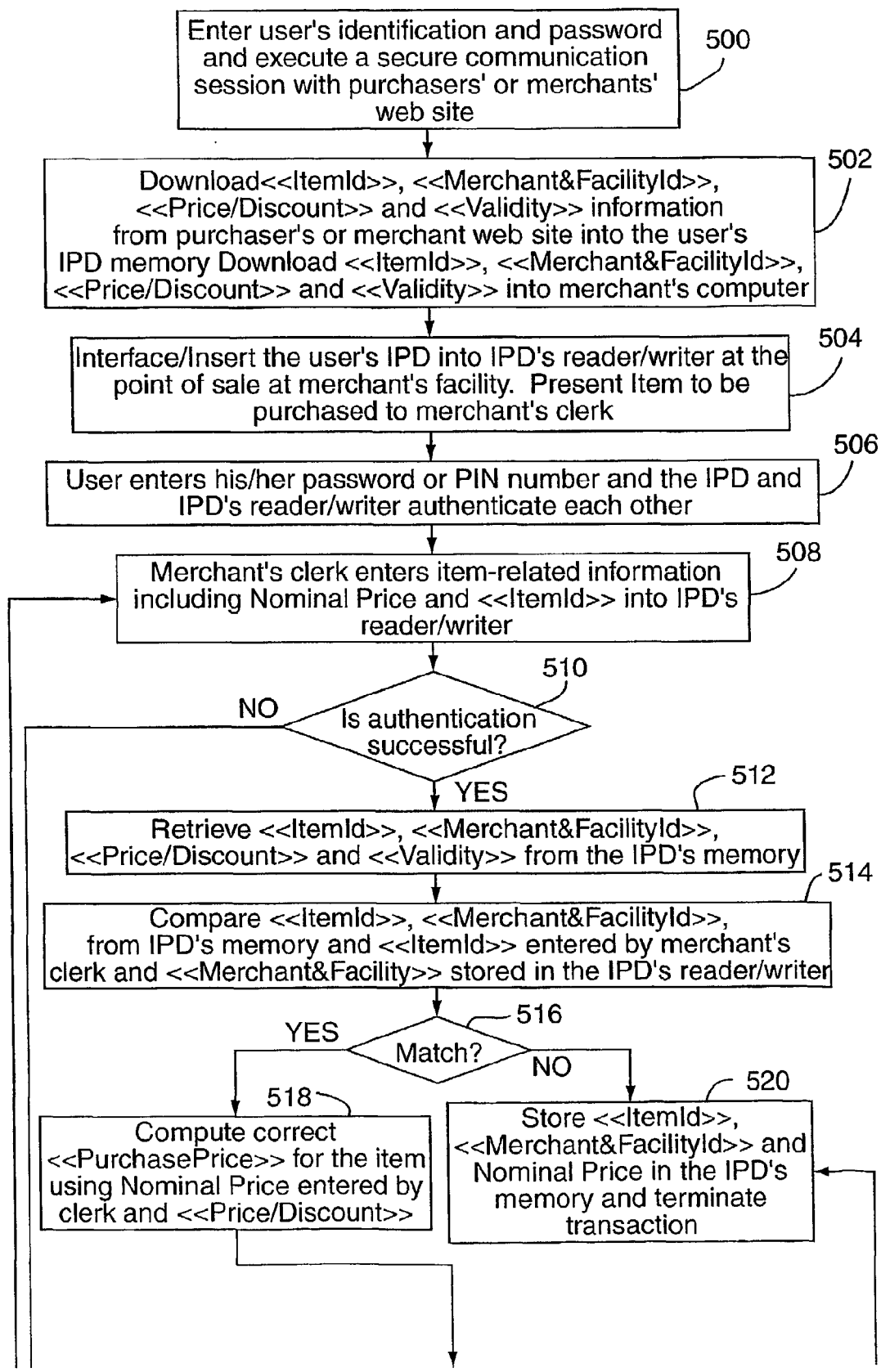
FIG. 12 is a flow diagram illustrating an example of a discount purchasing process in accordance with the present invention.
Figure 12B:
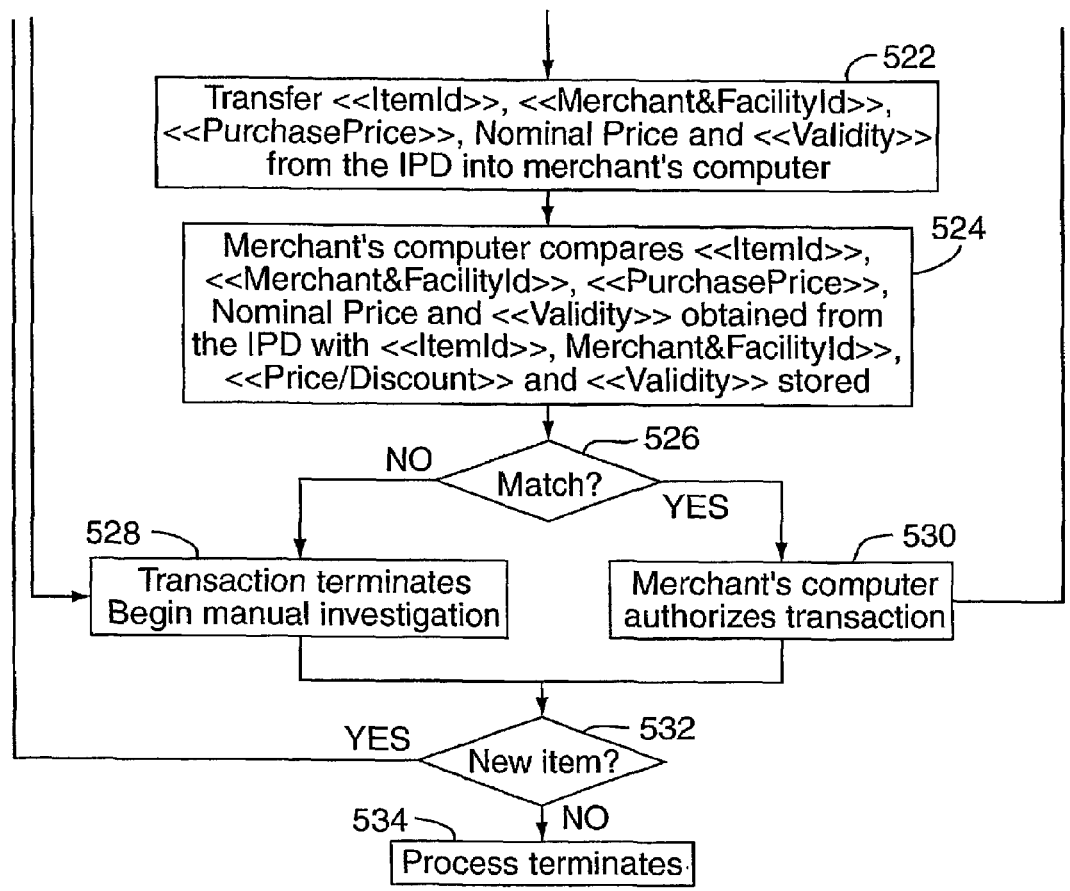
Figure 12:
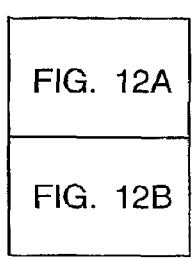

FIG. 12 shows by way of example a flow chart of a purchasing process using negotiated discounts in accordance with the present invention. Prior to commencement of a discount purchasing process, a user executes a secure communication session with a purchaser's or merchant's web site by, for example, entering an identification and password (step 500). When such secure communication session has been established, the user downloads into his/her IPD's memory <<ItemId>>, <<Merchant&FacilityId>>, <<Price/Discount>> and <<Validity>> parameters while the same information is loaded into the merchant's computer (step 502). In addition to these parameters, upon completion of negotiations the merchant computer also stores a list of identity numbers of all IPDs that are entitled for the discount program.

Upon arriving at merchant's facility, the user inserts his/her IPD into an IPD reader/writer attached to merchant's point-of-sale computer and presents an item to be purchased to a clerk (step 504). Then the user at step 506 enters his/her identification information such as password or PIN into the IPD reader/writer, and the IPD and the IPD reader/writer authenticate each other using one of the standard cryptographic protocols well known in the art (see, e.g., U. Hansmann, M Nicklous, T. Schak, F. Seliger, Smart Card, Application Development Using Java, Springer-Verlag, 2000). At step 508, the merchant's clerk enters item-related information including Nominal Price and <<ItemId>> into the IPD reader/writer (the <<Merchant&FacilityId>> parameter is fixed and always stored in the IPD reader/writer). The determination is made as to the success of authentication process (step 510). If authentication is not successful, the process terminates and manual investigation may commence (step 528). If the authentication is successful, the process continues where <<ItemId>>, <<Merchant&FacilityId>>, <<Price/Discount>> and <<Validity>> parameters are retrieved from the IPD memory (step 512). The retrieved <<ItemId>>, <<Merchant&FacilityId>> and <<ItemId>> entered by the clerk and <<Merchant&FacilityId>> stored in the IPD reader/writer memory are compared (step 514), and the determination of their match is made (step 516). If they do not match, the IPD stores <<ItemId>>, <<Merchant&FacilityId>> and the nominal price in its memory upon purchase approval by the user and the process terminates (step 520). If they match, the IPD computes correct <<PurchasePrice>> using <<Price/Discount>> information (step 518) and the process continues where <<ItemId>>, <<Merchant&FacilityId>>, <<PurchasePrice>>, Nominal Price and <<Validity>> parameters together with the IPD identification information are transferred from the IPD into the merchant's computer (step 522). The merchant's computer using the IPD identification information as a search parameter compares <<ItemId>>, <<Merchant&FacilityId>>, <<PurchasePrice>>, nominal price and <<Validity>> parameters obtained from the IPD with <<ItemId>>, <<Merchant&FacilityId>>, <<Price/Discount>>, Nominal Price and <<Validity>> information that has been stored in its memory (step 524), and the determination of their match is made (step 526). If they match, the merchant computer authorizes the transaction (step 530) and the process moves to the step 520. If, on the other hand, they do not match the transaction terminates and a manual investigation begins (step 528). The overall process may continue if a new item is presented for a purchase (step 532). In this case the process begins again (step 508); otherwise the overall process terminates (step 534).

In the case of purchasing through the Internet using e-commerce tools, the processes of the information submission from the IPD and the verification by the merchant's computer proceed in a similar fashion mostly without human involvement, except for the necessary "point and click" operations required for the identification of desired items by the user.

The case described here is particularly suitable for users that are employed by medium to large size companies capable of negotiating special discounts with travel service providers, office equipment suppliers and the like. However, the above-described method in accordance with the present invention works equally well with transactions other than above-described advertised or negotiated discount promotions. For example, consider the case when a merchant uses a direct mail or direct e-mail advertising program for initiating a special discount or promotion program. In this case, a user receives through regular mail or e-mail a notification of special discounts for different items or services together with his/her specially designed personal identification data that allow the user to access a secure merchant's web site and download all required information into his/her IPD.

One feature of the present invention allows reduction of communications between a merchant's point-of-sale computer and its central computer. Specifically, upon execution of a first transaction after a secure session between the point-of-sale computer and a central computer (server), the central computer can download all information required for verification of the discount into the point-of-sale computer. After this all verification computations can be done locally. This can be useful when there are restrictions on the bandwidth or the time allowed for a transaction.

In the case of double accounting, when a merchant's clerk or a merchant's computer inadvertently or deliberately attempts to charge the user multiple times for the same item, the IPD notifies/alerts the user of identical charges/identical items and may require manual intervention and approval before writing into the IPD memory details of the completed transaction. This and other similar intelligent functions can be programmed into the IPD by the user or the IPD issuer. This is particularly beneficial in reducing merchant fraud and typically high costs associated with resolution of disputes concerning credit/debit card purchases.

Beside facilitation of discount programs, the system of the present invention may be especially beneficial to control expenses by using pre-specified criteria that can be formulated by users and downloaded into their IPDs. The criteria can be formulated in terms of information (transaction) parameters downloaded into the IPD. For example, users may impose any combination of restrictions on transaction parameters such as <<ItemId>>, <<Merchant&FacilityId>>, <<Price/Discount>> and <<Validity>> by downloading restriction criteria into the IPD. This means that authorized users (accountable for all the charges incurred with their IPD) may specify that certain items can not be paid for using their IPDs, or they may restrict prices that can be paid for certain items. Similarly, users may restrict facilities where the charges can be made or the validity period for allowed charges or the validity period for the entire IPD. Any combination of restrictions may be imposed. For example, authorized users may allow only charges below a certain limit at only given facilities and only during a given period. This is beneficial for controlling certain travel expenses as companies frequently try to do. Another example is the use of credit cards given to teenagers by their parents or guardians. The authorized user may not only easily limit the total amount (which can be done today only by requesting a special credit card from a credit card company or a bank), but may also prohibit the use of card for purchasing alcohol, tobacco products and the like. Spouses of compulsive buyers may also find this feature highly desirable. There is no effective mechanism today to impose such restrictions. The system of the present invention allows user's definition and implementation of various restrictions on the use of credit or debit cards and other similar payment mechanisms without involvement of credit/debit card issuers. Implementation of such restrictions within an existing centralized system is nearly impossible and even with the use of smart cards would be cost prohibitive. This is particularly beneficial since the method of the present invention does not require credit/debit card issues to relinquish all traditional controls, checks and balances employed for the purpose of limiting financial losses. These and other intelligent processing features of the IPD are entirely within the scope and the spirit of the present invention.

Figure 13:
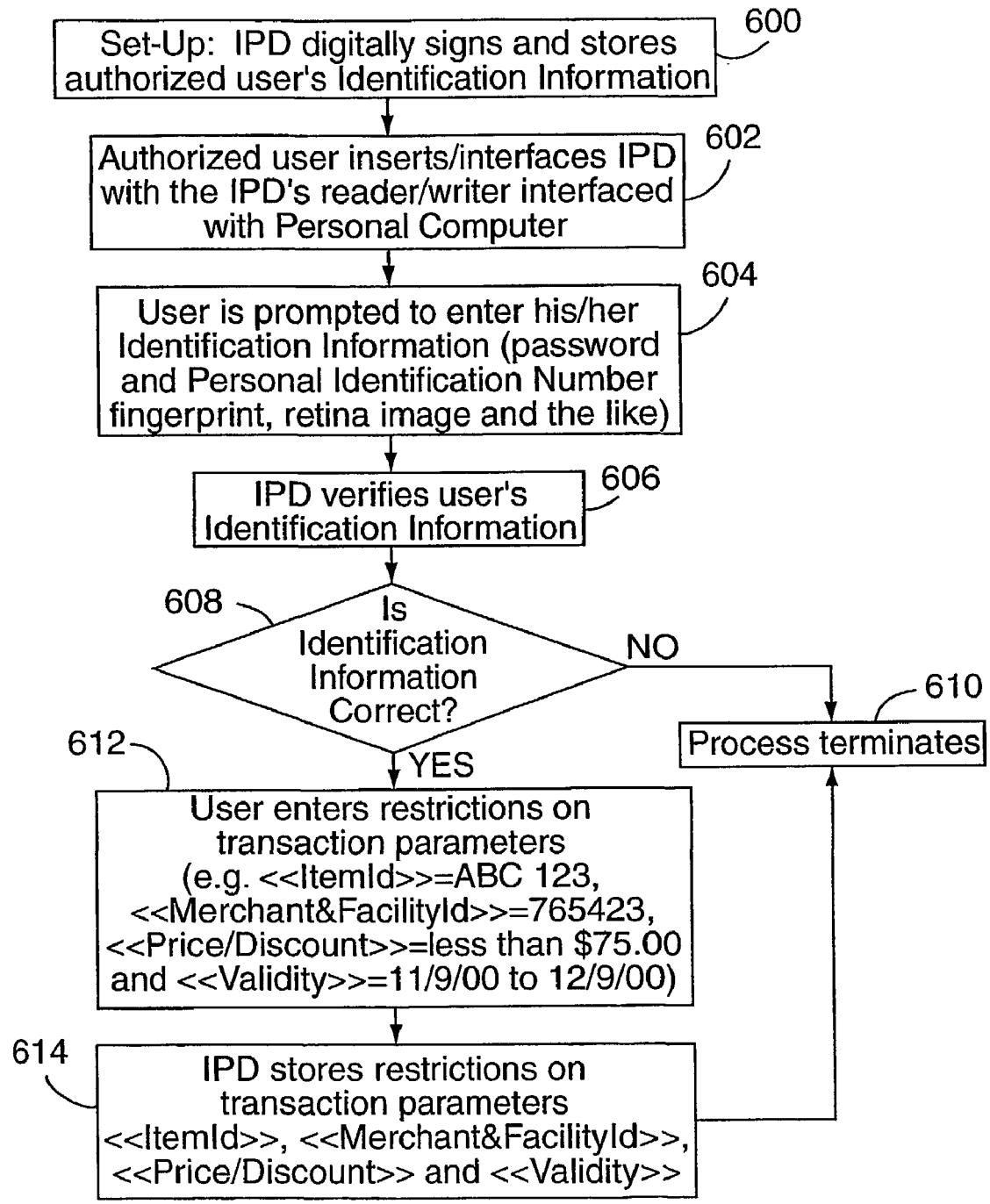
FIG. 13 is a flow diagram illustrating an example of an intelligent portable device set-up process in accordance with the present invention.
Figure 14:
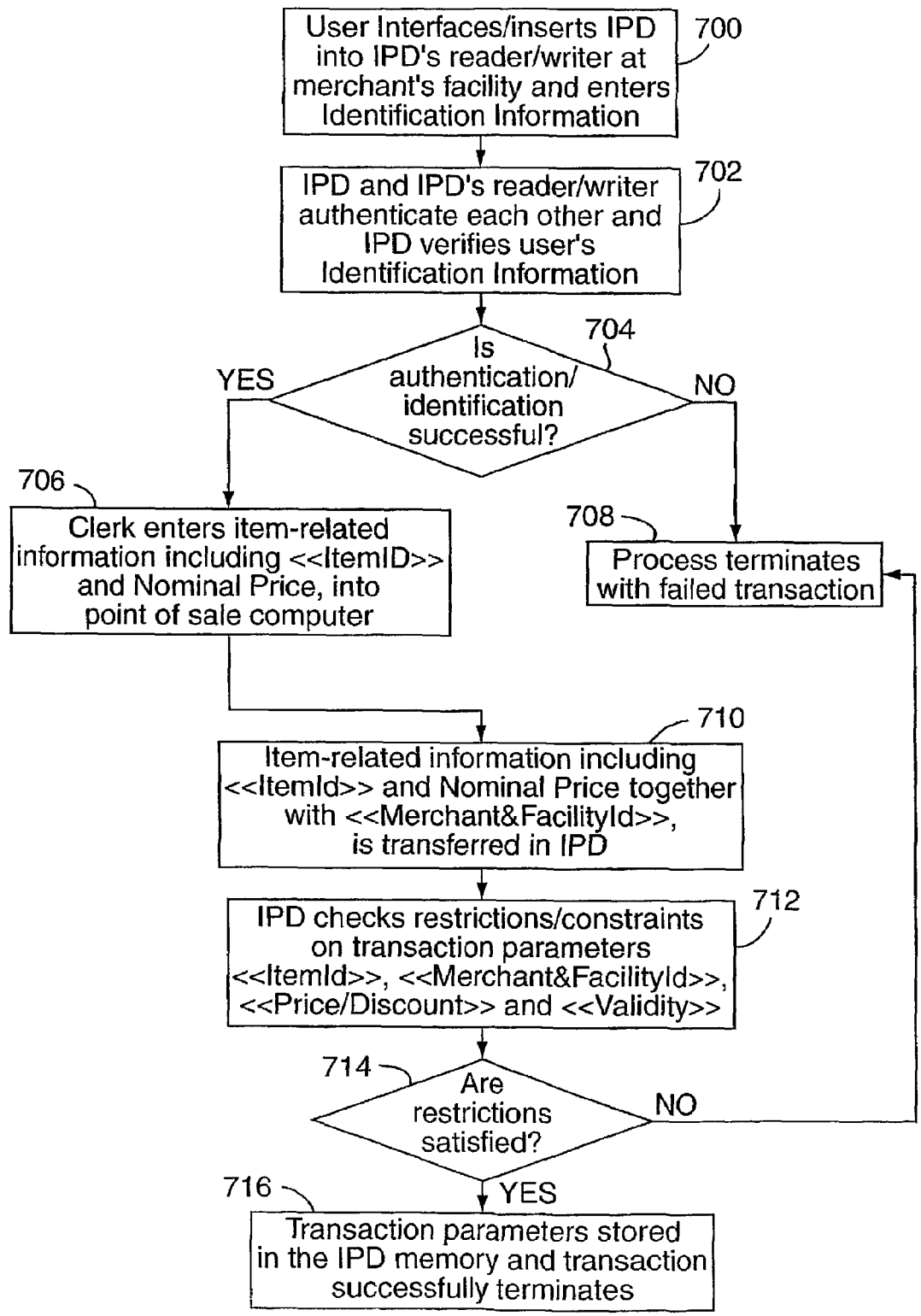
FIG. 14 is a flow diagram illustrating an example of an intelligent portable device usage transaction control process in accordance with the present invention.

The process of usage control according to the system of present invention is depicted in FIG. 13 (IPD control set up process) and FIG. 14 (IPD control usage process).

Referring now to FIG. 13, during the set up process an authorized user specifies his/her identification information that is personal to the authorized user. This can be biometric information such as a fingerprint or an eye's retina image or simply a PIN number. In the system of the present invention, the authorized user has a higher level of control than other users of the account. This means that there are several IPDs that may have the same account identification number but different user's identification information. This also means in practice that the authorized user's identification information allows him/her to change controllable transaction parameters as described below. All other users of the same account such as members of the household or subordinate employees typically have identification information that does not allow them to change controllable transaction parameters or lift restrictions imposed by the authorized user. Mechanisms to do so through so called master accounts and various levels of administrative privileges are well known in the art and are exercised daily by computer systems.

As shown in FIG. 13, the IPD digitally signs and stores an authorized user's identification information (step 600). The authorized user inserts his/her IPD into an IPD reader/writer interfaced with a personal computer (step 602), and the user is prompted by the personal computer to enter his/her identification information such as, for example, a password and personal identification number, fingerprint, retina image and the like (step 604). This information is transferred to the IPD, which verifies its correctness (step 606). The determination is made whether the entered information is correct (step 608). If the information is correct, the process continues at step 612 where the authorized user enters restrictions on transaction parameters (in the example shown, the user wishes to restrict purchasing to a class of items with identification numbers beginning with ABC 123, that can be purchased only from the merchant identified by the number 765423, and only if their price does not exceed $75.00 and only from Nov. 9 until Dec. 9 of the year 2000). Then the IPD stores the entered parametric restriction and the process successfully terminates (step 614). If the authentication process at step 606 fails, then the process terminates without any changes to the parameters stored in the IPD (step 610).

Referring now to FIG. 14, a flow chart of the usage control process in accordance with the present invention is described by way of example. The user interfaces/inserts IPD into an IPD reader/writer at a merchant's facility and enters his/her identification information (step 700). The IPD verifies the user's identification information and mutual authentication between the IPD reader/writer and the IPD is performed (step 702). The determination of success of these operations is made (step 704). If they are successful, then the merchant's clerk enters into the point-of-sale computer all required item-related information including <<ItemId>> and nominal price (step 706). If the identification/authentication at the step 702 fails, then the process terminates with a failed transaction and manual investigation may begin (step 708); otherwise the process continues where item-related information including <<ItemId>> and nominal price together with <<Merchant&FacilityId>> is transferred into the IPD (step 710). The IPD checks restrictions/constraints on transaction parameters <<ItemId>>, <<Merchant&FacilityId>>, <<Price/Discount>> and <<Validity>> (step 712). The determination is made whether all restrictions are satisfied (step 714). If they have been satisfied, all transaction parameters are stored in the IPD memory for subsequent verification by the user and the transaction successfully terminates (step 716). If the restrictions stored in the IPD are not satisfied the process terminates with a failed transaction (step 708). In this case, there are no changes in the IPD memory.

Figure 15:
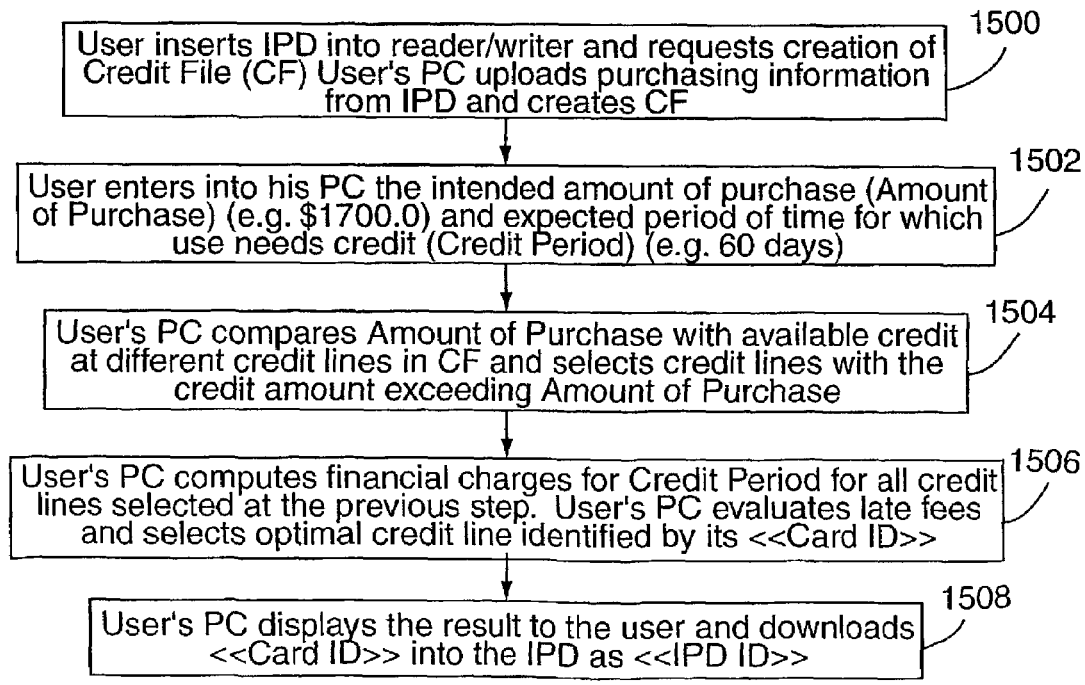
FIG. 15 is a flow diagram illustrating an example of an intelligent portable device credit line control process in accordance with the present invention.

Referring now to FIG. 15, a flow chart of a credit line control process in accordance with the present invention is described by way of example. The user typically has multiple credit lines with different available interest rates, credit limits and fees. This means that a user's personal computer has access a Credit File (CF) which may, for example, appear as shown in Table 1 set forth below:

TABLE 1

| Credit Line ID or <<Card ID>> | Credit Limit | Available Credit | Daily Interest Rate | Late Fees |
|---|---|---|---|---|
| 1. VISA 1234 5567 0045 8734 | $5,000.00 | $3,566.77 | 0.05315% | $25 |
| 2. VISA 9334 5867 1255 3478 | $1,000.00 | $275.00 | 0.05232% | $30 |
| 3. MC 9834 5588 0145 893778 | $2,000.00 | $1,563.50 | 0.04987% | $15 |
| 4. OPTIMA 9375 1389 2312 78316 | $3,000.00 | $3,000.00 | 0.05111% | $10 |

The presently available credit may always be uploaded from the IPD as described above. For example, user may request his/her personal computer to create a Credit File at any moment based on the information stored in the IPD. Referring to FIG. 15, the user inserts his/her IPD into an IPD reader/writer and requests his personal computer to upload purchasing information from the IPD to create a credit file (step 1500). At step 1502, the user enters into his PC the intended amount of purchases (e.g. $1,700.00) and (optionally) the period of time for which the credit is to be extended (e.g. 60 days) (i.e. the amount of time after which the final payments for the purchases can be made). The user's personal computer compares the desired amount of the intended purchase with the available credit at all credit lines and selects credit lines where the amount of available credit exceeds the intended amount of purchase (step 1504). In the example, the amount of purchase is $1,700.00 which exceeds the amount available from the second VISA and MC credit lines. At step 1506 the user's computer computes and compares financial charges based on 60 days of required credit and daily interest rates for the first VISA card and OPTIMA card and, possibly late fees (which may be important if the user may be late with payments). In this example, the OPTIMA card offers lower interest charges as well as lower late fees, so the user's computer displays the result of the optimization process to the user and activates OPTIMA identification <<Card ID>> =9375 1389 2312 78316 as the <<IPD ID>> (step 1508). The entire process of activation may take place a few hours before the purchasing activity (e.g. in the morning) or through an ATM machine if the ATM machine has access to the Credit File (CF), or through a remote access to user's computer. At the time of purchasing the user upon presenting his/her IPD to the merchant's clerk and inserting it into IPD's reader/writer simply informs the clerk the credit card being used is OPTIMA and the process proceeds as usual.

The system for facilitating payment may be used in another application with IPDs. As will be recalled, an IPD is a portable computer device containing a microprocessor, a storage memory (capable of retaining written data without a continuous power supply), input/output system and an operating system. One particularly popular implementation of an IPD is a smart card well known in the art. When an intelligent payment device is used for payment in the form of a smart credit or debit card it is typically inserted into an IPD reader/writer capable of writing and reading into and from the IPD. The card user is required to enter authentication information such as a personal identification number (PIN) into the IPD reader/writer that is always equipped with a keypad. A system and method of payment using IPDs in accordance with the present invention includes partitioning of the IPD memory into records that are stored for different purposes. For example, each record in the IPD memory may have a numeric identifier (purpose attribute) as shown in Table 2.

TABLE 2

| Record Serial No. | Merchant ID | Merchandise ID | $$ Value | Date | Purpose Attribute (Identifier) |
| --- | --- | --- | --- | --- | --- |
| Record 1 | 776356 | 913457 | $75 | Feb. 15, 2001 | [1] Personal |
| Record 2 | 776356 | 913459 | $100 | Feb. 15, 2001 | [2] Business |
| Record 3 | 127931 | 2341781 | $250 | Feb. 16, 2001 | [3] Tax Deductible |
| Record 4 | 934592 | 7734129 | $57 | Feb. 20, 2001 | [4] Health Care |

As can be seen from Table 2, each record stored in the smart card or IPD memory has been indexed by a single digit numeric attribute defining the purpose of the expense. In practice this attribute may be entered into the IPD reader/writer at the time of purchase through a numeric keypad that is built into or otherwise associated with the IPD reader/writer for enabling the IPD holder to enter the holder PIN number. For example, an employee traveling on company business is required to enter his or her PIN while paying lodging expenses in a hotel. The PIN number is usually a four-digit number such as <1234>. Instead of entering just <1234>, the employee enters <12342>indicating to the card that the expense is for business. The card uses <1234>for authentication and then stores all expense related information in a record with a purpose attribute <2>(business). Similarly, if the expense is personal then the employee enters PIN <1234>and <1>as a numeric attribute indicative of personal expenses.

As a result of this process, the IPD separately stores different expenses. Then at the appropriate moment, all these computerized records of expenses can be retrieved by an application running on a personal computer connected to an IPD reader/writer. This allows the complete automation of expense report processing, tax accounting, health care accounts and the like. When the user generated expense report is submitted for payment it can be automatically and independently verified by using credit/debit issuing card company's records available at the company Web site (after appropriate authentication). The presence of a payment record on a credit/debit card company Web site indicates that this company indeed made the payment thus confirming information from the expense report or tax account report produced by the user's computer. In accordance with the present invention, all such reports are submitted electronically.

Figure 16:
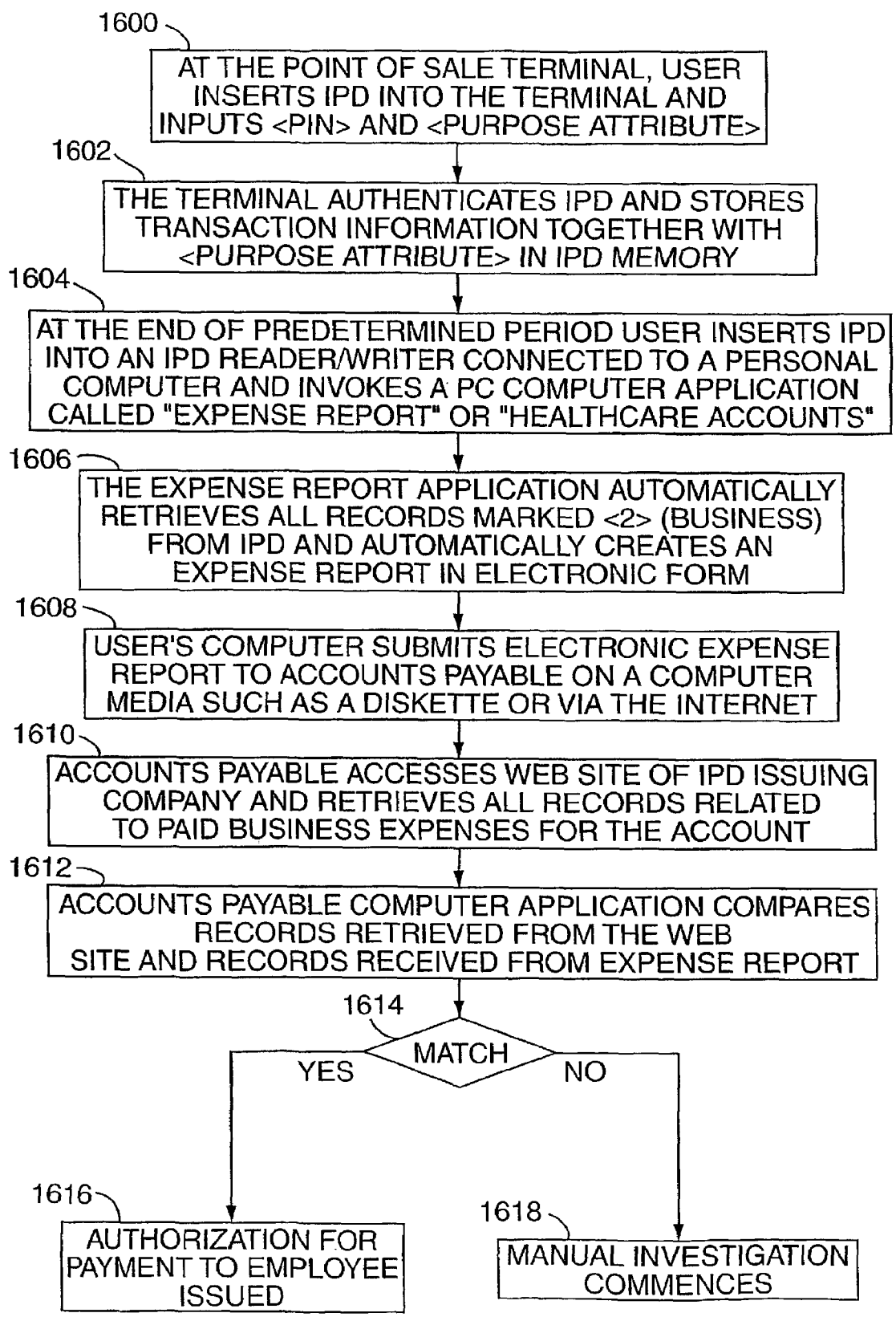
FIG. 16 is a flow diagram illustrating the categorization of expenses in an intelligent portable device.

A flow diagram illustrating the categorization of expenses in an intelligent portable device (IPD) will now be explained by way of example with reference to FIG. 16. At the point of sale terminal, the user inserts IPD into the terminal (containing IPD reader/writer) and keys in his/her <PIN> number and one or two digit <purpose attribute> (step 1600). The terminal authenticates the IPD and stores transaction information together with <purpose attribute> in the IPD memory (step 1602). At the end of a predetermined period the user inserts the IPD into an IPD reader/writer connected to a personal computer and invokes a personal computer application called, for example, "expense report" or "healthcare account" (step 1604). The expense report application automatically retrieves all records marked <2> (business) from the IPD and automatically creates an expense report including user's business expenses in electronic form (step 1606). The user's computer submits the electronic expense report to accounts payable through a computer media such as, for example, a diskette or through a private or public communication network such as the Internet (step 1608). Accounts payable upon receiving an expense report in pre-defined computerized format (e.g. Microsoft Excel spread sheet) accesses the Web site of the IPD issuing company and retrieves all records related to paid business expenses for the account (step 1610). The accounts payable computer application compares records retrieved from the Web site and records received with computerized expense report (step 1612). The accounts payable computer application then determines if there is a match (step 1614). If there is a match, authorization is issued for payment to the employee for the total amount indicated in the expense report (step 1616). If there is not a match, a manual investigation of the discrepancy commences (step 1618).

In accordance with the present invention all paper records can be maintained for the purpose of investigation or dispute resolution. Further, the IPD/card issuing company may have different PINs issued for the same card to differentiate the purpose of the expense. For example, PIN 1234 may be only for business expenses, and PIN 1237 only for personal expenses. In this case, the end user can share business PIN <1234> with accounts payable department to enable accounts payable employees access to the Web site containing only business related expenses. Thus, privacy is maintained and personal expenses of the user are not exposed.

Although this invention has been shown and described with respect to exemplary embodiments thereof, it should be understood by those skilled in the art that the foregoing and various other changes, omissions, and additions in the form and detail thereof may be made therein without departing from the spirit and scope of the invention. Accordingly, the present invention has been shown and described by way of illustration rather than limitation.

What is claimed is:

1. A method of validating service bills, comprising the steps of:
   monitoring service usage of a service user with a service entity by a first monitoring subsystem under the control of the user;
   determining using the first monitoring subsystem at least one user-generated fee value representing an amount due to the service entity for service usage of the user over a predetermined billing period;
   monitoring service usage of the user by a second monitoring subsystem under the control of the service entity, the first and second monitoring subsystems being distinct from one another;
   determining using the second monitoring subsystem at least one service-generated fee value representing the amount due to the service entity for the service usage of the user over the predetermined billing period;
   comparing the user and service-generated fee values;
   determining that the user and service-generated fee values are within a predetermined threshold amount; and,
   based upon said determination, validating the amount due determined from a predetermined one of the user and service-generated fee values.

2. The method as defined in claim 1, wherein, upon validating the amount due, further including the step of authorizing a payment of the amount due to the service entity.

3. The method as defined in claim 1, wherein the service usage is a credit/debit transaction including a payment of the amount due by the service entity to a merchant on behalf of the user, and the first monitoring subsystem includes a first electronic-card reader/writer under control of the user for facilitating the credit/debit transaction.

4. The method as defined in claim 3, wherein the second monitoring subsystem includes a second electronic-card reader/writer under control of the merchant.

5. The method as defined in claim 3, further including the step of providing usage control restrictions by a primary user to limit usage of other secondary users in a debit/credit transaction including at least one of: maximum purchase price, type/class of goods/services, predetermined merchants/facilities, validity period, and wherein the step of monitoring service usage includes refusing service usage if such usage does not satisfy a control restriction.

6. The method as defined in claim 3, further including the step of downloading discounts from a merchant Web site into an electronic card via the first electronic-card reader/writer, the discounts being available for purchases in a debit/credit transaction with predetermined merchants/facilities for predetermined goods/services.

7. The method as defined in claim 6, further including the step of providing access control to authorized users prior to the step of downloading discounts.

8. The method as defined in claim 1, wherein the steps of monitoring service usage include monitoring telephone usage.

9. The method as defined in claim 1, further including the step of employing at least one of hash values and digital signatures to confirm the integrity of information used to calculate the user-generated fee value.

10. The method as defined in claim 1, wherein the first monitoring subsystem includes an electronic-card reader/writer under control of the user for facilitating service usage, the electronic-card reader/writer employing a plurality of purpose attributes for identifying types of expenses.

11. The method as defined in claim 10, wherein each of the plurality of purpose attributes is identified by at least one number.

12. The method as defined in claim 10, wherein each of the plurality of purpose attributes is separate from and in addition to a personal identification number (PIN).

13. The method as defined in claim 10, wherein each of the plurality of purpose attributes is a personal identification number (PIN).

14. The method as defined in claim 10, wherein the types of expenses include personal expenses, business expenses, healthcare expenses and tax deductible expenses.

15. A system for validating service bills, the system comprising:
   a first monitoring subsystem under the control of a service user for determining at least one user-generated fee value representing an amount due to a service entity for service usage of the user over a predetermined billing period; and
   a second monitoring subsystem communicating with the first monitoring subsystem, the second monitoring subsystem under the control of the service entity for determining at least one service-generated fee value representing the amount due to the service entity for the service usage of the user over the predetermined billing period, one of the first and second monitoring subsystems comparing the user and service-generated fee values;
   determining that the user and service-generated fee values are within a predetermined threshold amount; and,
   based upon said determination, validating the amount due determined from a predetermined one of the user and service-generated fee values.

16. The system as defined in claim 15, wherein one of the first and second monitoring subsystems authorizes payment of the amount due upon validating the amount due.

17. The system as defined in claim 15, wherein the first monitoring subsystem includes a first electronic-card reader/writer under control of the user for monitoring a debit/credit transaction involving payment of the amount due by the service entity on behalf of the user.

18. The system as defined in claim 17, wherein an electronic card used with the first electronic-card reader/writer is one of a smart card and a PCMCIA card.

19. The system as defined in claim 17, wherein the second monitoring subsystem includes a second electronic-card reader/writer under control of a merchant.

20. The system as defined in claim 15, wherein the first monitoring subsystem includes a line-monitoring device under control of the user for monitoring telephone usage.

21. The system as defined in claim 15, wherein the first monitoring subsystem includes an electronic-card reader/writer under control of the user for facilitating the service usage, the electronic-card reader/writer employing a plurality of purpose attributes for identifying types of expenses.

22. The system as defined in claim 21, wherein each of the plurality of purpose attributes is identified by at least one number.

23. The system as defined in claim 21, wherein each of the plurality of purpose attributes is separate from and in addition to a personal identification number (PIN).

24. The system as defined in claim 21, wherein each of the plurality of purpose attributes is a personal identification number (PIN).

25. The system as defined in claim 21, wherein the types of expenses include personal expenses, business expenses, healthcare expenses and tax deductible expenses.

26. A method of paying utility bills, comprising the steps of:
- monitoring utility usage of a utility user by a first monitoring subsystem under control of the user;
- calculating using the first monitoring subsystem at least one user-generated fee value representing an amount due to a utility entity for utility usage of the user over a predetermined billing period;
- monitoring utility usage of the user by a second monitoring subsystem under control of the utility entity, the first and second monitoring subsystems being distinct from one another;
- calculating using the second monitoring subsystem at least one utility-generated fee value representing the amount due to the utility entity for the utility usage of the user over the predetermined billing period;
- comparing the user and utility-generated fee values;
- determining that the user and utility-generated fee values are within a predetermined threshold amount; and,
- based upon said determination, authorizing a payment of the amount due determined from a predetermined one of the user and utility-generated fee values.

27. The method of paying as defined in claim 26, wherein the utility usage to be monitored is telephone usage.

28. The method of paying as defined in claim 27, wherein the step of monitoring telephone usage includes employing a line-monitoring device (LMD) by the first monitoring subsystem, the LMD-monitoring information including: the identity information of the utility entity, a telephone-call-recipient telephone number, and the times of day when connection has been established and terminated between the telephones of the user and call recipient.

29. The method of paying as defined in claim 26, wherein the step of monitoring utility usage by the first monitoring subsystem includes employing a line-monitoring device.

30. The method of paying as defined in claim 26, wherein the step of calculating using the first monitoring subsystem includes executing a software algorithm on a computer under the control of the user.

31. The method of paying as defined in claim 26, wherein the step of comparing includes transferring the utility-generated fee value from the second monitoring subsystem to the first monitoring subsystem, and performing the comparison using the first monitoring subsystem.

32. The method of paying as defined in claim 31, wherein the step of paying the amount due includes automatically authorizing, using the first monitoring subsystem, an electronic transfer of money for payment of the amount due from a money-withdrawal source of the user to a money-deposit source of the utility entity, the amount due determined from the predetermined one of the user and utility-generated fee values.

33. The method of paying as defined in claim 26, wherein the step of comparing includes transferring the user-generated fee value from the first monitoring subsystem to the second monitoring subsystem, and performing the comparison using the second monitoring subsystem.

34. The method of paying as defined in claim 33, wherein the step of paying the amount due includes automatically authorizing, using the second monitoring subsystem, an electronic transfer of money for payment of the amount due from a money-withdrawal source of the user to a money-deposit source of the utility entity.

35. The method as defined in claim 26, further including the step of employing at least one of a hash value and a digital signature to confirm the integrity of information used to calculate the user-generated fee value.

36. A system for paying utility bills, the system comprising:
- a first monitoring subsystem under the control of a utility user for calculating at least one user-generated fee value representing an amount due to a utility entity for utility usage of the user over a predetermined billing period; and
- a second monitoring subsystem communicating with the first monitoring subsystem, the second monitoring subsystem under the control of the utility entity for calculating at least one utility-generated fee value representing the amount due the utility entity for the utility usage of the user over the predetermined billing period, one of the first and second monitoring subsystems comparing the user and utility-generated fee values;
- determining that the user and utility-generated fee values are within a predetermined threshold amount; and, based upon said determination, authorizing a payment of the amount due determined from a predetermined one of the user and utility-generated fee values.

37. The system as defined in claim 36, wherein the utility usage to be monitored is telephone usage.

38. The system as defined in claim 36, wherein the first monitoring subsystem includes:
- a line-monitoring device (LMD) communicating with the utility entity to be monitored for measuring utility usage; and
- a computer communicating with the LMD and including means for calculating the user-generated fee value representing the amount due to the utility entity.

39. The system as defined in claim 38, wherein the LMD monitors information including: the identity information of the utility entity, a telephone-call-recipient telephone number, and the times of day when connection has been established and terminated between the telephones of the user and call recipient.

* * * * *